US007781995B2

(12) United States Patent
Yang et al.

(10) Patent No.: US 7,781,995 B2
(45) Date of Patent: Aug. 24, 2010

(54) TRASH CAN WITH POWER OPERATED LID

(75) Inventors: Frank Yang, Rancho Palos Verdes, CA (US); Joseph Sandor, Santa Ana Heights, CA (US)

(73) Assignee: simplehuman, LLC, Torrance, CA (US)

( * ) Notice: Subject to any disclaimer, the term of this patent is extended or adjusted under 35 U.S.C. 154(b) by 131 days.

(21) Appl. No.: 11/514,518

(22) Filed: Sep. 1, 2006

(65) Prior Publication Data

US 2007/0182551 A1 Aug. 9, 2007

Related U.S. Application Data

(63) Continuation-in-part of application No. 11/438,839, filed on May 23, 2006, which is a continuation-in-part of application No. 11/074,140, filed on Mar. 7, 2005.

(51) Int. Cl.
*H02P 1/00* (2006.01)
*H02P 3/00* (2006.01)
*H02P 5/00* (2006.01)

(52) U.S. Cl. ....................... 318/266; 318/466; 318/468; 220/211; 220/244

(58) Field of Classification Search ................. 318/266, 318/466, 468; 220/211, 244
See application file for complete search history.

(56) References Cited

U.S. PATENT DOCUMENTS 2,888,307 A 5/1959 Graves et al.
4,217,616 A * 8/1980 Jessup ......................... 361/31
4,729,490 A 3/1988 Ziegenbein
4,996,467 A * 2/1991 Day ........................... 318/480
5,535,913 A 7/1996 Asbach et al.
5,650,680 A 7/1997 Chula
6,211,637 B1 4/2001 Studer
6,596,983 B2 7/2003 Brent
6,812,655 B1 11/2004 Wang et al.
6,859,005 B2 2/2005 Boliver
2004/0020927 A1 2/2004 Yang et al.
2006/0196874 A1 9/2006 Yang
2006/0255033 A1 11/2006 Yang et al.

FOREIGN PATENT DOCUMENTS

DE 91008341 10/1991
JP 02152670 12/1990

* cited by examiner

*Primary Examiner*—Bentsu Ro
*Assistant Examiner*—Erick Glass
(74) *Attorney, Agent, or Firm*—Knobbe, Martens, Olson & Bear LLP

(57) ABSTRACT

A trash can can include a sensor for detecting the presence of an object near a lower portion of the trash can. The detection of the object can be used to signal the trash can to open its lid. The trash can can include an electric drive unit for opening and closing the lid.

23 Claims, 20 Drawing Sheets

TRASH CAN WITH POWER OPERATED LID

PRIORITY INFORMATION

The present application is a continuation-in-part of U.S. patent application Ser. No. 11/438,839, filed May 23, 2006, which is a continuation-in-part of U.S. patent application Ser. No. 11/074,140, filed Mar. 7, 2005, the entire contents of both is hereby expressly incorporated by reference.

BACKGROUND OF THE INVENTIONS

1. Field of the Inventions

The present inventions relate to power operated devices, such as power operated lids or doors for receptacles.

2. Description of the Related Art

Receptacles and other devices having a lid or a door are used in a variety of different settings. For example, in both residential and commercial settings, trash cans and other devices often have lids for protecting or preventing the escape of the contents of the receptacle. In the context of trash cans, some trash cans include lids or doors to prevent odors from escaping and to hide the trash within the receptacle from view. Additionally, the lid of a trash can helps prevent contamination from escaping from the receptacle.

Recently, trash cans with power operated lids have become commercially available. Such trash cans can include a sensor positioned on or near the lid. Such a sensor can be configured to detect movement, such as a user's hand being waived near the sensor, as a signal for opening the lid. When such a sensor is activated, a motor within the trash receptacle opens the lid or door and thus allows a user to place items into the receptacle. Afterwards, the lid can be automatically closed.

However, such motion sensors present some difficulties. For example, typical motion sensors are configured to detect changes in reflected light. Thus, a user's clothing and skin color can cause the device to operate differently. More particularly, such sensors are better able to detect movement of a user's hand having one clothing and skin color combination, but less sensitive to the movement of another user's hand having a different clothing and/or skin color combination.

If such a sensor is calibrated to detect the movement of any user's hand or body part within twelve inches of the sensor, the sensor may also be triggered accidentally. If the sensor is triggered accidentally too often, the batteries powering such a device can be worn out too quickly, energy can be wasted, and/or the motor can be over used. However, if the sensors are calibrated to be less sensitive, it may be difficult for some users, depending on their clothing and/or skin color combination, to activate the sensor conveniently.

SUMMARY OF THE INVENTIONS

An aspect of at least one of the embodiments disclosed herein includes the realization that the problems associated with motion sensors mounted on a trash receptacle to detect movement of a user's hand can be avoided by mounting such a sensor on a lower portion of the trash receptacle. For example, but without limitation, the sensor can be disposed in a position appropriate for detecting movement of a user's foot. Such a motion sensor can be oriented to detect movement in a limited area near the floor upon which the receptacle sits. Thus, the sensor is less susceptible to false detections caused by movement of other bodies in the room. Further, such a sensor can be mounted in a recess defined by the housing of the receptacle, such that a user can move their foot into or near the recess to trigger the motion sensor. This provides even greater reliability that the sensor will issue a detection signal only when the user intends to open the receptacle.

Another aspect of at least one of the embodiments disclosed herein includes the realization that by configuring a sensor arrangement to detect movement of a lower extremity of a user, a more simple, less expensive sensor can be used. For example, in some embodiments, a simple interrupt-type sensor, such as an optical sensor, can be used to detect the presence of a non-transparent body. Such an interrupt or optical sensor can be disposed on a lower portion of a trash receptacle. As such, when a user intends to trigger the trash can to, for example, open its lid, the user can place their foot in a position to trip the optical sensor. As such, the sensor more reliably issues a detection signal only when the user intends to activate the sensor. Additionally, it is not necessary for the user to bend down to activate the sensor.

Thus, in accordance with at least one embodiment disclosed herein, an enclosed receptacle can comprise a receptacle portion defining a reservoir, and a door mounted relative to the receptacle and configured to move between open and closed positions. A sensor can be mounted in the vicinity of a lower portion of the receptacle and configured to output a detection signal and a control mechanism can be configured to move the door between the open and closed positions, the sensor being connected to the control mechanism, the controller being configured to move the door to the open position when the sensor outputs a detection signal.

Another aspect of at least one of the inventions disclosed herein includes the realization that occasionally, a user of a trash can having a power operated lid may desire to have the lid held open for an indefinite period of time. Thus, such a trash can with a power operated lid can be provided with a mode selector button configured to allow a user to select at least one mode of operation of the lid in which the lid is held open for an extended or an indefinite period of time.

Thus, in accordance with at least one embodiment, an enclosed receptacle can comprising a receptacle portion defining a reservoir, a door mounted relative to the receptacle and configured to move between open and closed positions, and a first user input device configured to output a signal. A second user input device can be disposed apart from the first user input device and a control mechanism connected to both the first and second user input devices, the control device being configured to move the door toward the open position based on a signal from the first user input device, the control mechanism being wither configured to hold the door in the open position based on a signal from the second user input device.

Yet another aspect of at least one of the inventions disclosed herein includes the realization that, occasionally, when using a receptacle with a power operated lid or door, a user may interfere with movement of the lid while it is being moved by a powered actuator. As such, the actuator can be damaged by excessive loads applied by an external body. Thus, such a receptacle with a powered lid or door can include features for avoiding damage that can be caused by forces applied to the lid or door. For example, a powered actuator for opening such a lid or door can include a load sensor configured to stop or close the lid of resistance is detected during opening. Additionally, in at least one embodiment, such a receptacle can include a linkage between the actuator and the lid or door which allows the lid or door to be opened to any extent beyond that position corresponding to the position of the powered actuator at any moment.

Thus, in accordance with at least one embodiment disclosed herein, an enclosed receptacle can comprise a receptacle portion defining a reservoir, a door mounted relative to the receptacle and configured to move between open and closed positions, and a user input device configured to output a signal, A control mechanism can be mechanically connected to the user input device and interfaced with the door such that the control mechanism can operate to push the door toward the open position and the door can be manually moved toward the open position without the control mechanism operating.

In accordance with yet another embodiment, an enclosed receptacle can comprise a receptacle portion defining a reservoir, a door mounted relative to the receptacle and configured to move between opened and closed positions, and a power supply. A motor can be configured to move the door between the opened and closed positions, and a controller can be configured to control operation of the door. The controller can comprise a door movement trigger module configured to allow a user to issue a command to the controller to open the door and a power supply voltage monitor module configured to detect a voltage of the power supply only once each time the command has been detected by the door movement trigger module. A door position monitor module can have at least one sensor configured to monitor a position of the door. A door position sensor control module can be configured to supply power to the at least one sensor only when the door is being moved by the motor. A motor drive module can be configured to vary the power output of the motor to compensate for variations in a voltage of the power supply detected by the power supply voltage monitor and for variations in a force required to move the door at a substantially constant speed based on the position of the door detected by the door position monitor module. A braking module can be configured to slow the movement of the door as it approaches a stop position by reversing the power output of the motor for a predetermined braking time beginning at a predetermined position before the opened and closed positions of the door. Additionally, a fault detection module can be configured to stop operation of the motor and to provide an indication of a fault if the motor has been operating for more than a predetermined time period.

In accordance with the further embodiment, an enclosed receptacle can comprise a receptacle portion defining a reservoir, a door mounted relative to the receptacle and configured to move between opened and closed positions, and a power supply. A motor can be configured to move the door between the opened and closed positions and a controller configured to control operation of the door. The controller can comprise a door movement trigger module configured to allow a user to issue a command to the controller to open the door and a power supply voltage monitor module configured to detect a voltage of the power supply when the command has been detected by the door movement trigger module.

In accordance with yet another embodiment, an enclosed receptacle can comprise a receptacle portion defining a reservoir, a door mounted relative to the receptacle and configured to move between opened and closed positions, and a power supply. A motor can be configured to move the door between the opened and closed positions and a controller can be configured to control operation of the door. The controller can comprise a door movement trigger module configured to allow a user to issue a command to the controller to open the door. A door position monitor module can have at least one sensor configured to monitor a position of the door and a door position sensor control module can be configured to selectively supply power to the at least one sensor when the door is being moved by the motor.

In accordance with an embodiment, an enclosed receptacle can comprise a receptacle portion defining a reservoir, a door mounted relative to the receptacle and configured to move between opened and closed positions, a power supply and a motor configured to move the door between the opened and closed positions. A controller can be configured to control operation of the door. The controller can comprise a power supply voltage monitor module configured to detect a voltage of the power supply and a motor drive module configured to vary the power output of the motor to compensate for variations in a voltage of the power supply detected by the power supply voltage monitor.

In accordance with yet another embodiment, an enclosed receptacle can comprise a receptacle portion defining a reservoir, a door mounted relative to the receptacle and configured to move between opened and closed positions, and a power supply. A motor can be configured to move the door between the opened and closed positions and a controller configured to control operation of the door. The controller can comprise a braking module configured to slow the movement of the door as it approaches a stop position by reversing the power output of the motor for a predetermined braking time beginning at a predetermined position before the opened and closed positions of the door.

In accordance with an additional embodiment, an enclosed receptacle can comprise a receptacle portion defining a reservoir, a door mounted relative to the receptacle and configured to move between opened and closed positions, and a power, supply. A motor can be configured to move the door between the opened and closed positions and a controller can be configured to control operation of the door. The controller can comprise a fault detection module configured to stop operation of the motor and to provide an indication of a fault if the motor has been operating for more than a predetermined time period.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF THE PREFERRED EMBODIMENTS

The embodiments of a powered system for opening and closing a lid or door of a receptacle or other device is disclosed in the context of a trash can. The inventions disclosed herein are described in the context of a trash can because they have particular utility in this context. However, the inventions disclosed herein can be used in other contexts as well, including, for example, but without limitation, large commercial trash cans, doors, windows, security gates, and other larger doors or lids, as well as doors or lids for smaller devices such as high precision scales, computer drives, etc.

Figure 1:
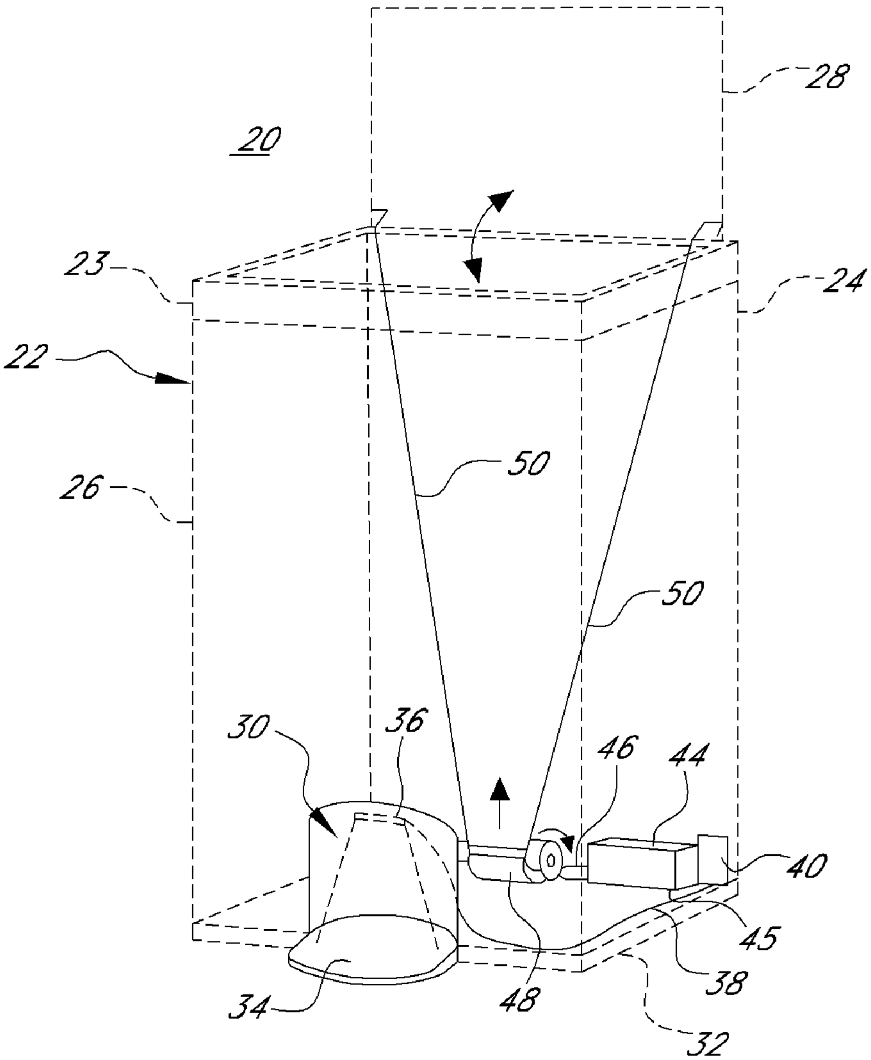
FIG. 1 is a front perspective view of a trash can assembly according to one embodiment, shown with the lid opened.

With reference to FIG. 1, a trash can assembly 20 can include an outer shell 22 and an inner liner (not shown) configured to be retained within the outer shell. For example, an upper peripheral edge of the outer shell 22 can be configured to support an upper peripheral edge of a liner, such that the liner is suspended by its upper peripheral edge within the shell 22. However, other designs can also be used.

The outer shell 22 can assume any configuration. The non-limiting embodiment of FIG. 1 illustrates an outer shell 22 having a generally four-sided rectangular configuration with a rear wall 24 and a front wall 26. The inner liner can have the same general configuration, or a different configuration from the outer shell 22. The outer shell 22 can be made from plastic, steel, stainless steel, aluminum or any other material.

The upper portion of the outer shell 22 is defined by an upper peripheral member 23. The upper peripheral member 23 can be made from plastic, steel, stainless steel, aluminum or any other material. Additionally, it is not necessary that the upper peripheral member 23 be made separate from the shell 22. For example, the upper peripheral member 23 can be made integrally or monolithically with the outer shell 22. However, in some embodiments, the outer shell 22, including the walls 24, 26, are made from a stainless steel. In such embodiments, the upper peripheral member 23 can also be formed from stainless steel, either integrally or monolithically or separate from the shell 22. However, in some embodiments, the upper peripheral member 23 can be made from a plastic material.

A lid 28 is pivotally connected to an upper portion of the upper peripheral member 23. The pivotal connection can be defined by any type of connection allowing for pivotal movement, such as, for example, but without limitation, a hinge.

The trash can 20 can also include a foot recess 30 positioned at a lower portion of the trash can 20. For example, in some embodiments, the foot recess 30 can be defined by a portion of the outer shell 22 adjacent a bottom 32 of the outer shell 22.

Similarly to the upper peripheral member 23, the bottom 32 of the trash can 20 can be made integrally, monolithically, or separate from the shell 22. Thus, the base 32 can be made from any material including plastic, steel, stainless steel, aluminum or any other material. Additionally, in some embodiments, such as those in which the shell 22 is stainless steel, the base 32 can be a plastic material.

The recess 30 can be formed from a shaped portion of the shell 22 or can be made integrally with the bottom 32. Thus, the recess 30 can be made from plastic, steel, stainless steel, aluminum or any other material.

The recess 30 can extend inwardly into the general outer periphery defined by the shell 22. Additionally, the recess 30 can extend upwardly from the bottom 32. A foot plate can be optionally provided at a bottom of the recess 30, and can extend from the bottom 32.

In some embodiments, a sensor 36 is provided adjacent an upper portion of the recess 30 in a position where the sensor 36 can be directed downwardly toward the ground upon which the trash can 20 rests or the foot plate 34.

The sensor 36 can be any type of sensor. For example, in some embodiments, the sensor 36 is configured to detect movement or the presence of an object disposed in the recess 30. For example, the sensor 36 can be configured to emit a detection signal when a foot is disposed in the recess 30. The sensor can be considered a "user input device" because a user can use the sensor 36 to issue a command to the trash can 20.

The sensor 36 can be coupled to a lid control system configured to control the opening and closing of the lid 28. In the illustrated embodiment, the lid control system includes wiring 38 provided inside the outer shell 22 connecting the sensor 36 to a circuit board 40. The circuit board 40, in turn, is coupled via wiring 45 to a motor gear 46 that drives a rotary lifting bar 48.

Batteries 44 can be coupled to the circuit board 40 and the motor gear 46. The lid control system can further include a pair of link rods 50 which extend generally vertically adjacent and along the rear wall 24.

Figure 1A:
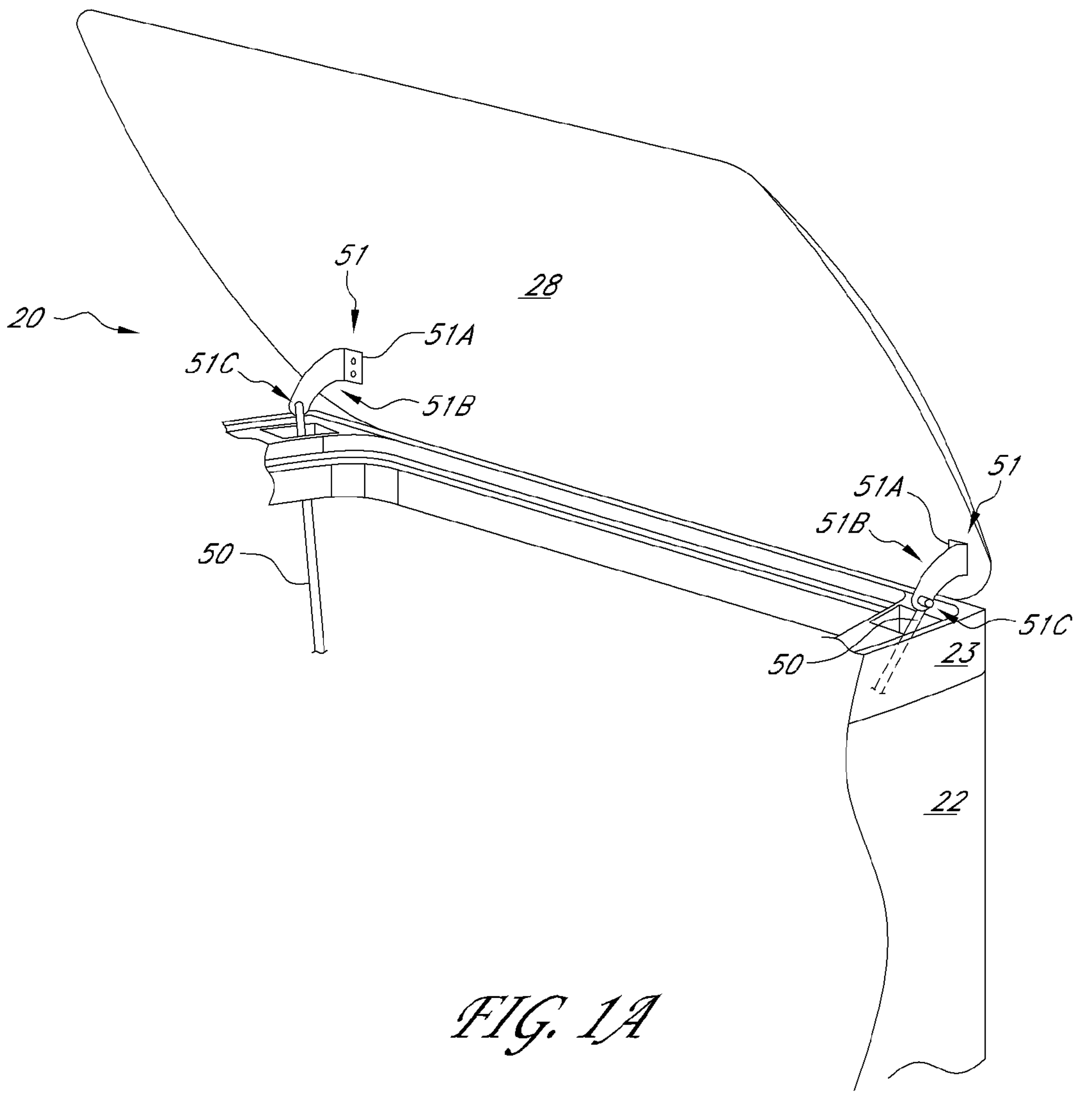
FIG. 1A is en enlarged perspective view of the mechanisms used to connect the lid of the trash can assembly of FIG. 1 with connecting rods.

Each rod 50 can have a first end coupled to the lifting bar 48 and an opposite second end that is coupled to the lid 28. FIG. 1A illustrates an optional configuration for connecting the link rods 50 to the lid 28.

As illustrated in FIG. 1A, the link rods 50 are connected to an inner side of the lid 28 via bracket assemblies 51. In the illustrated embodiment, the bracket assemblies 51 include a mounting portion 51A connecting to the inner surface of the lid 28. The mounting portions 51A can be attached to the lid 28 with any type of connector, fastener, or through bonding, welding, etc. In the illustrated embodiment, the mounting portions 51A are connected to the lid 28 with rivets.

The bracket assemblies 51 also include arm members 51B extending from the mounting portions 51A toward an interior of the trash can 20. The arms 51B can also include apertures 51C at an end of the arm 51B distal from the mounting portion 51A.

The upper ends of the link rods 50 extend through the apertures 51C. Although not shown, the ends of the link rods 50 can also include retainer members configured to retain the ends of the link rods 50 in a position extending through the apertures 51C.

In this configuration, the arms 51B maintain the ends of the link rods 50 at a position spaced from the inner surface of the lid 28. As such, the link rods 50 obtain an improved moment of torque for lifting the lid 28 from a closed position to an open position. Thus, any arrangement can be used to connect the upper ends of the link rods to the lid 28.

With continued reference to FIG. 1, the circuit board 40, batteries 44, motor gear 46, and lifting bar 48 are illustrated as being positioned adjacent the bottom 32 and inside the outer shell 22. However, these elements can be positioned anywhere inside or outside the outer shell 22.

The circuit board 40 can include a control circuit that is configured to control the operation of the motor gear 46 and the opening and closing motions of the lid 28. The control circuit can be implemented using circuit designs that are well known to those skilled in the art. For example, although indicated as a "circuit," the control circuit can comprise a processor and memory storing a control program. As such, the control program can be written to cause the processor to perform various functions for controlling the motor gear 46 in accordance with input from the sensors, such as the sensor 36 and/or other devices.

In some embodiments, the motor gear 46 can be driven in two directions so that the motor gear 46 can turn the lifting bar 48 in two directions. For example, when the lifting bar 48 rotates in a first direction, the link rods 50 are pushed upwardly to push the lid 28 open. When the lifting bar 48 rotates in an opposite second direction, the link rods will move downwardly to pull the lid 28 towards the closed position.

Figure 3C:
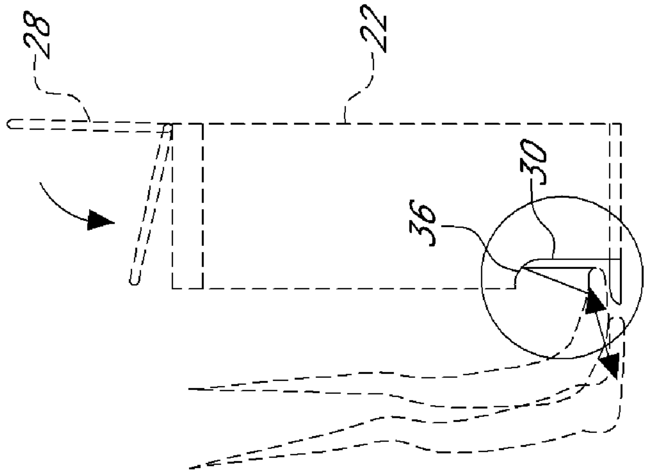
FIGS. 3A-3C are side plan views illustrating the operation of the assembly of FIG. 1.
Figure 3B:
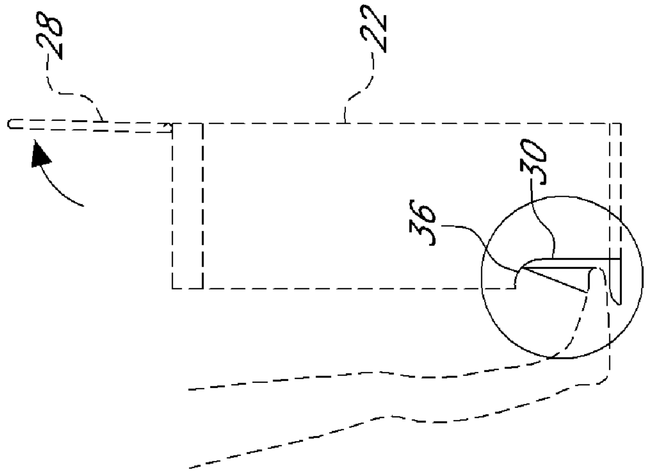
Figure 3A:
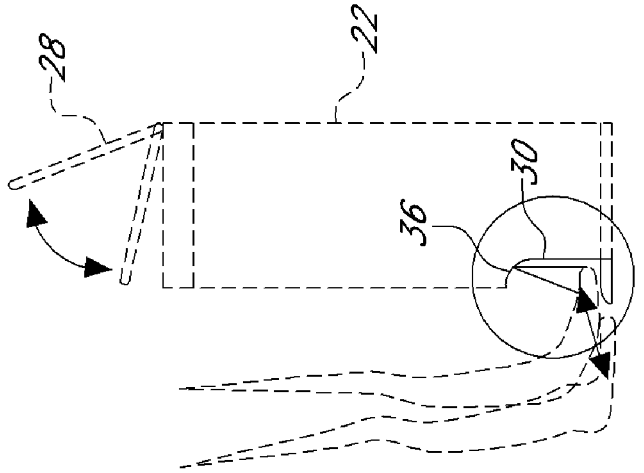

FIGS. 3A-3C illustrate an exemplary operation of the opening and closing of the lid 28 of the trash can assembly 20. With the lid 28 in the closed position, the sensor 36 can be actuated when a user inserts a foot (or other object) into the recess 30 into the path of the sensor 36. The actuation of the sensor 36 will cause the control circuit in the circuit board 40 to drive the motor gear 46 in the required direction to rotate the lifting bar 48 in the first direction to open the lid 28.

If the user immediately removes the foot (or other object) from the recess 30 (see FIG. 3A), then the lid 28 will remain opened for a specific period of time (e.g., two seconds), and then the control circuit in the circuit board 40 will drive the motor gear 46 in the opposite direction to rotate the lifting bar 48 in the second direction to close the lid 28. However, if the user's foot (or other object) remains in the recess 30 (see FIG. 3B) for more than a predetermined period of time (e.g., two seconds), then the control circuit in the control board 48 will maintain the lid 28 in the opened position indefinitely or for a greater predetermined period of time.

In the situation shown in FIG. 3B, the user will eventually remove the foot (or other object). After the foot has been removed in the FIG. 3B situation, if the foot (or other object) is then re-inserted into the recess 30 into the path of the sensor 36 (see FIG. 3C), then the control circuit in the circuit board 40 will drive the motor gear 46 in the opposite direction to rotate the lifting bar 48 in the second direction to close the lid 28.

Figure 2:
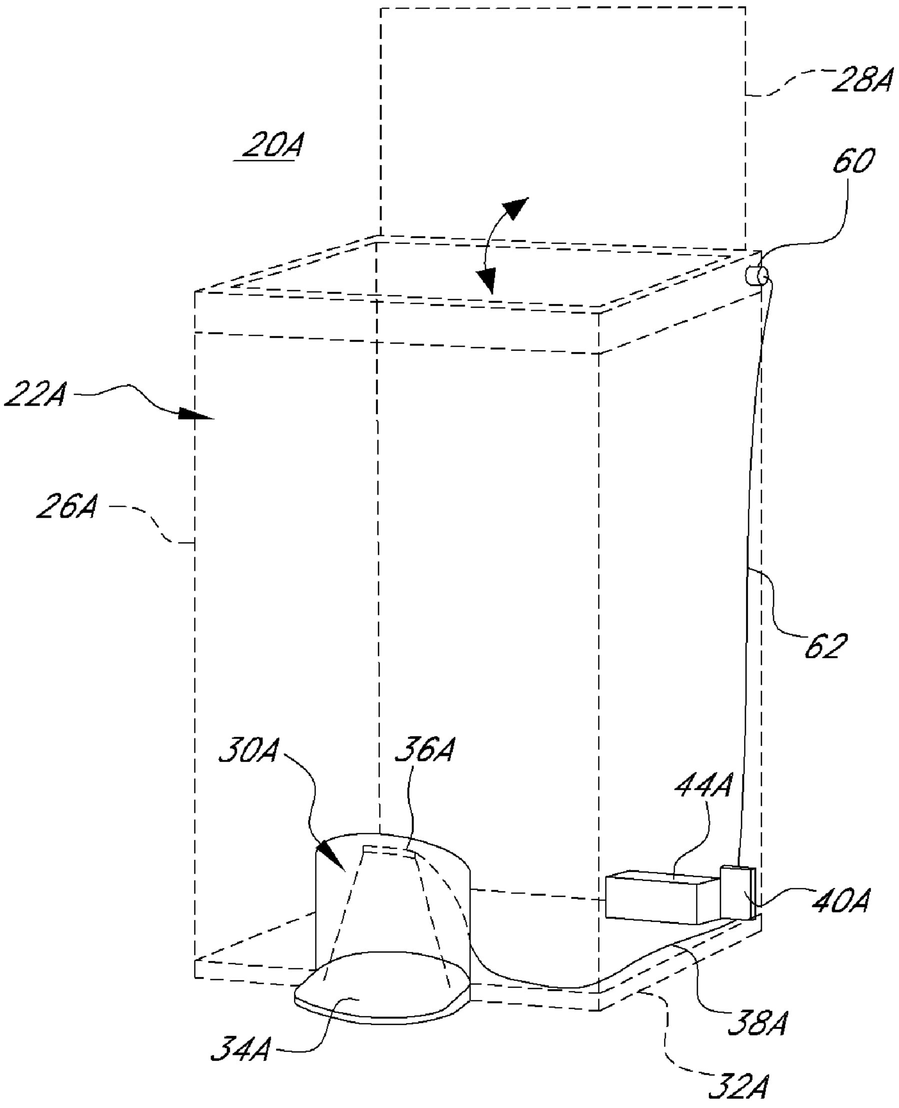
FIG. 2 is a front perspective view of a trash can assembly according to another embodiment, shown with the lid opened.

FIG. 2 illustrates another embodiment of a trash can assembly 20*a*. The assembly 20*a* is similar to the assembly 20 of FIG. 1, so the same elements in FIGS. 1 and 2 have the same numeral designations except that an "a" is added to the designations in FIG. 2.

The difference between the assemblies 20 and 20*a* is that the assembly 20*a* has a different lid control system that is used to open and close the lid 28*a* after the sensor 36*a* has been actuated. For example, the motor gear 46 and rods 50 in the assembly 20 are replaced by a motor hinge 60 and wiring 62 that couples the circuit board 40*a* to the motor hinge 60. The motor hinge 60 functions to open and close the lid 28*a* by turning the hinged connection of the lid 28*a* in the requisite direction.

The motor hinge 60 can be embodied in the form of any motor hinge that is well-known in the art. The operations described in connection with FIGS. 3A-3C can also be performed by the assembly 20*a*, with the control circuit in the control board 40*a* programmed to control the motor hinge 60 in the same manner as for the motor gear 46.

By positioning the sensor 36, 36*a* inside a recess 30, 30*a*, the sensors 36, 36*a* are less likely to be accidentally actuated. To actuate the sensors 36, 36*a*, the user can deliberately insert a foot (or other object) or other object into a recesses 30, 30*a* which are located close to the ground. While this will not eliminate accidental actuation of the sensors 36, 36*a*, it allows for a highly sensitive sensor to be used while significantly minimizing accidental actuation of the sensors 36, 36*a* and the subsequent opening of the lids 28, 28*a*.

Figure 4:
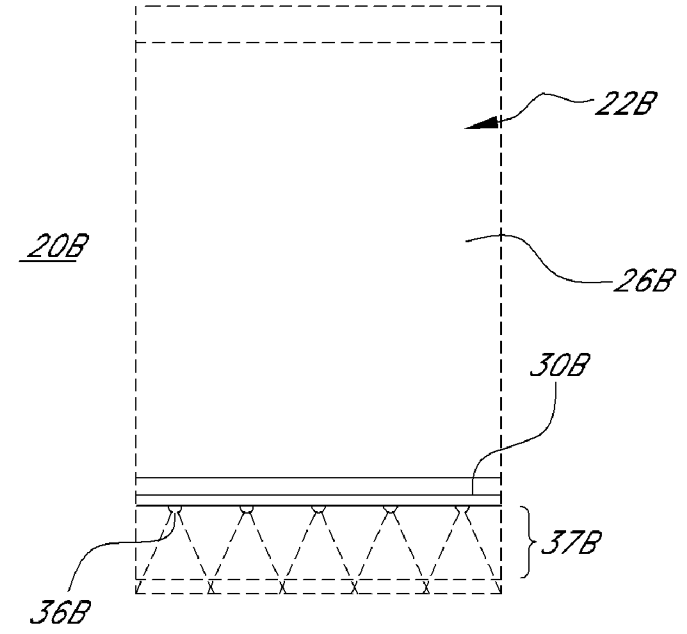
FIG. 4 is a front plan view of a trash can assembly according to another embodiment.
Figure 5:
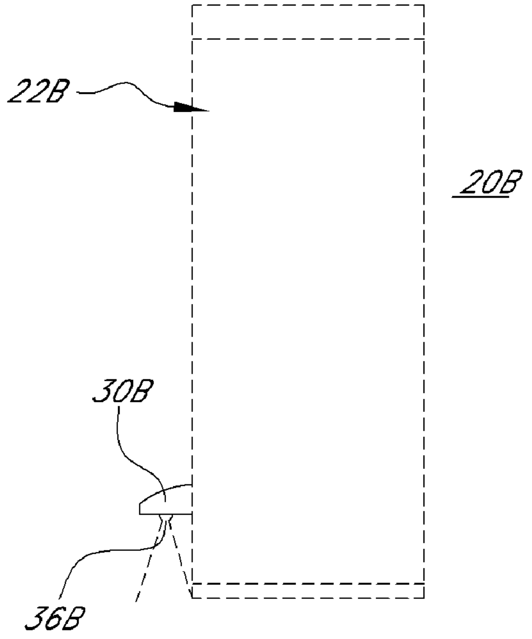
FIG. 5 is a side plan view of the trash can assembly of FIG. 4.

Notwithstanding the above, it is also possible to omit the recesses 30, 30*a*. For example, FIGS. 4 and 5 illustrate a trash can assembly 20*b* that can be identical to the trash can assembly 20*a* except that the front wall 26*b* does not have a recess. Instead, a canopy 30*b* extends from the periphery of the front wall 26*b* to define a covered region 37*b*.

In some embodiments, a plurality of sensors 36*b* can be provided in spaced-apart manner on the underside of the canopy 30*b*. In other words, any number (e.g., one or more) of sensors 36*b* can be provided, depending on the length of the canopy 30*b* and the desired use.

Providing a greater number of sensors 36*b* can allow the user to actuate one of the sensors 36*b* more easily because the user only needs to place the foot (or other object) in the direct path of any of the sensors 36*b*, while providing a single sensor 36*b* requires that the user place the foot (or other object) in the direct path of the single sensor 36*b*. The plurality of sensors 36*b* can be coupled via wiring (not shown, but can be the same as 38*a*) to a circuit board (not shown, but can be the same as 40*a*).

Thus, the embodiment illustrated in FIGS. 4 and 5 provides a covered region 37*b* adjacent the bottom of the outer shell 22*b* where the user can actuate one or more sensors 36*b*. The embodiment illustrated in FIGS. 4 and 5 also illustrates the provision of more than one sensor 36*b*, and the same principle can be applied to FIGS. 1 and 2, where a plurality of sensors 36, 36*a* can be provided in the respective recess 30, 30*a*. As an alternative, the canopy 30*b* can be provided along a side wall (e.g., 35*b*) of the outer shell 22*b* instead of along the front wall 26*b*.

FIGS. 6-13 illustrate another embodiment of the trash can 20, identified generally by the reference numeral 20*c*. Some of the components of the trash can 20*c* are the same as the corresponding components of the trash cans 20, 20*a*, 20*b* described above. These corresponding components are identified with the same reference numerals, except that a "c" has been added thereto. Additionally, it is to be understood that the features described with regard to the trash can 20*c* can also be used with the trash cans 20, 20*a*, and 20*b*.

Figure 6:
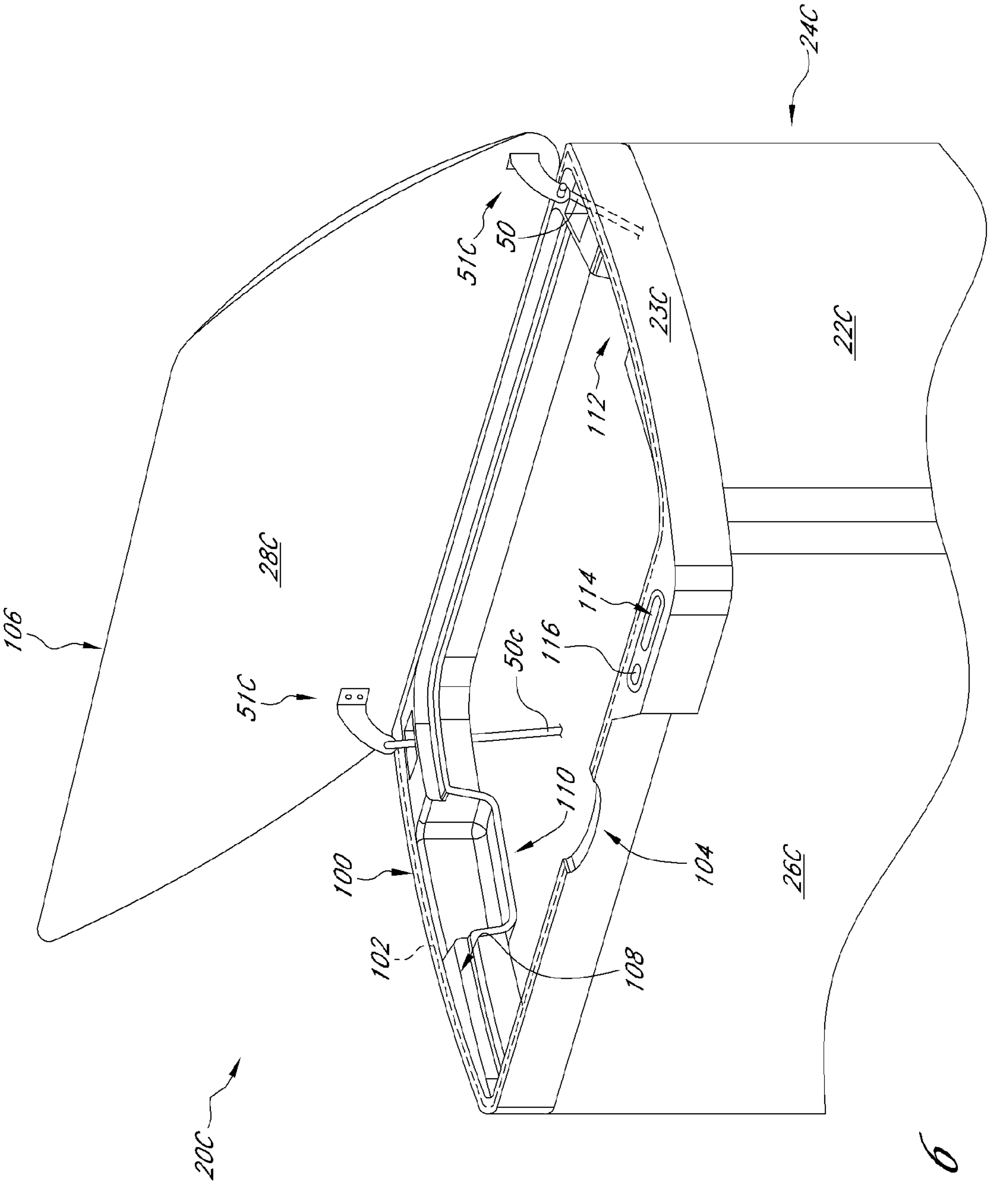
FIG. 6 is an enlarged perspective view of an upper portion of a modification of the trash can assemblies illustrated in FIGS. 1-5.

With continued reference to FIG. 6, the trash can 20*c* can include an upper peripheral surface 100 configured to provide a substantially flat surface against which the inner surface of the lid 28*c* can rest when the lid 28*c* is in a closed position. The phantom line 102 extending along the upper surface 100 illustrates the general position of the lid 28*c* when the lid 28*c* is in a closed position.

Further, as shown in FIG. 6, the upper portion 23*c* of the trash can 20*c* can include a recess 104. The recess 104 can be formed from a portion of the upper surface 100 that is recessed downwardly from the remainder of the surface 100. The majority of the surface 100 can be configured to generally follow along the surface of the lid 28*c* when the lid 28*c* is closed. However, the recess 104 is sized so as to allow a human to insert at least one or more fingers beneath the forward edge 106 of the lid 28*c* when the lid 28*c* is closed. As such, a user can lift the lid 28*c* manually, if desired.

The upper portion 23*c* can also include a ledge 108 configured to provide support for a liner of the trash can 20*c*. For example, a liner can have a shape that is generally complimentary to the shell 22*c*. Additionally, an upper peripheral edge of such a liner (not shown) can have a radially outward protruding portion provided with sufficient strength that the entire weight of the liner and the maximum weight for which the liner is designed to contain can be supported therefrom.

The upper portion 23*c* can include a ledge 108 configured to engage with the radially outward protruding portion of the liner so as to support the liner within the shell 22*c*. Thus, when the liner is inserted into the shell 22*c*, the entire weight of the liner is supported by the ledge 108. However, the trash can 20*c* can also include further supports within the shell 22*c* to support the weight thereof.

The upper portion 23*c* can also include additional recesses, for example, recesses 110, 112. The recesses 110, 112 can be configured to allow a human user to insert their fingers within the recess and below the outwardly protruding portion of the liner. This provides additional convenience in that it is easier for a user to lift the liner out of the shell 22*c*, for example, when a user desires to empty the trash out of the liner.

In some embodiments, the trash can 20*c* can include the user operable button 114. The button 114 can be configured to allow a user of the trash can 20*c* to, for example, change a mode of operation of the trash can 20*c*. As such, the button 114 can be considered to be a "user input device" because is allows a user to issue a command to the trash can 20*c*. Examples of the modes of operation are described below.

Additionally, the trash can 20*c* can include an indicator device 116 configured to provide a user with an indication of a mode in which the trash can 20*c* operates. Examples of such modes are described in greater detail below. In some embodiments, the indicator 116 is a light, such as, for example, but without limitation, an LED.

Figure 7:
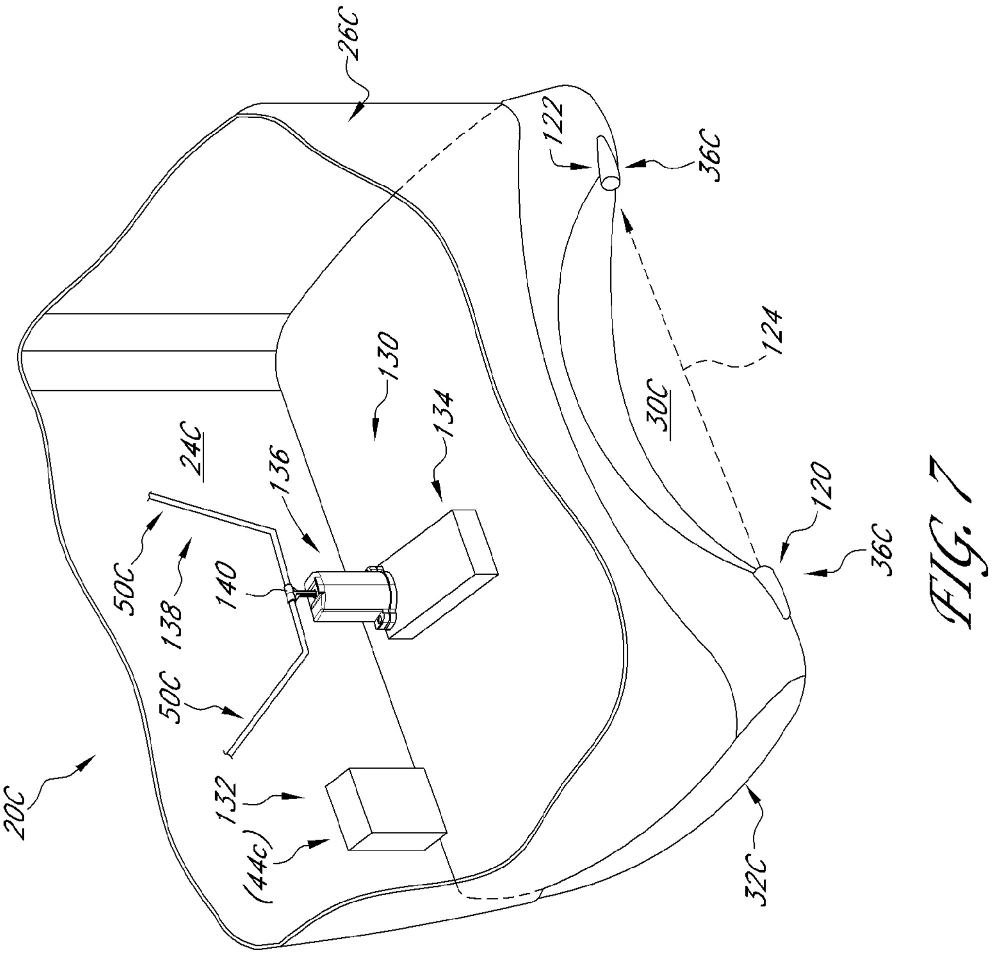
FIG. 7 is an enlarged perspective and partial cut-away view of a lower portion of the trash can shown in FIG. 6, illustrating an actuator for controlling the movement of the lid.

FIG. 7 illustrates a perspective and partial cut-away view of a lower portion of the trash can 20*c*. In some embodiments, the sensor 36*c* can be a "trip light" or "interrupt" sensor. For example, as illustrated in FIG. 7, the sensor 36*c* comprises a light emitting portion 120 and a light receiving portion 122. As such, a beam of light 124 is emitted from the light emitting portion 120 and is received by the light receiving portion 122.

This sensor 36*c* can be configured to emit a trigger signal when the light beam 124 is blocked. For example, if the sensor 36*c* is activated, and the light emitting portion 120 is activated, but the light receiving portion 122 does not receive the light emitted from the light emitting portion 120, then the sensor 36*c* can emit a trigger signal. This trigger signal can be used for controlling operation of the lid 28*c*, described in greater detail below.

This type of sensor provides further advantages. For example, because the sensor 36*c* is merely an interrupt-type sensor, it is only triggered when a body is disposed in the path of the light beam 124. Thus, the sensor 36*c* is not triggered by movement of a body in the vicinity of the beam 124. Rather, the sensor 36*c* is triggered only if the light beam 124 is interrupted. To provide further prevention of unintentional triggering of the sensor 36*c*, the sensor 36*c*, including the light emitting portion 120 and the light receiving portion 122, can be further recessed into the recess 30*c*.

This type of sensor 36*c* provides additional advantages. For example, the sensor only requires enough power to generate a low power beam of light 124, which may or may not be visible to the human eye, and to power the light receiving portion 122. These types of sensors require far less power than infrared or motion-type sensors. Additionally, the sensor 36*c* can be operated in a pulsating mode. For example, the light emitting portion 120 can be powered on and off in a cycle such as, for example, but without limitation, for short bursts lasting for any desired period of time (e.g., 0.01 second, 0.1 second, 1 second) at any desired frequency (e.g., once per half second, once per second, once per ten seconds). As such, this type of cycling can greatly reduce the power demand for powering the sensor 36*c*. In operation, such cycling does not produce unacceptable results because as long as the user maintains their foot or other appendage or device in the path of the light beam 124 long enough for a detection signal to be generated, the lid 28*c* can be actuated.

The sensor 36*c* can be connected to the circuit board 40 of the trash cans 20, 20*a*, or it can be connected to the lid control mechanism 130 illustrated in FIG. 7. The lid control mechanism 130 can include a power supply 132, a controller 134, a drive unit 136, and a link arrangement 138. However, other arrangements and components can also be used.

The power supply 132 can comprise a battery pack 44*c*, an alternating current (AC) power supply, a direct current (DC) power supply, or any combination of these or other power supplies. In the illustrated embodiment, the power supply 132 includes both a battery storage portion for operating the lid control system 130 on battery power and a DC power supply port for allowing the trash can 20*c* to be plugged into household or other power supplies, with an appropriate AC to DC converter. However, any power supply 132 can be used.

The controller 134 can include the circuit board 40 or it can include any other type of controller. In the illustrated embodiment, the controller 134 includes a processor and a memory for storing a control program. Those of ordinary skill in the art can readily develop a control routine for providing the functionality described below.

The drive unit 136 can be controlled by the controller 134 to raise and lower the link arrangement 138. The link arrangement 138 can comprise the link members 50*c* or any other arrangement of mechanisms for connecting the drive unit 136 with the lid 28*c*.

Figure 8:
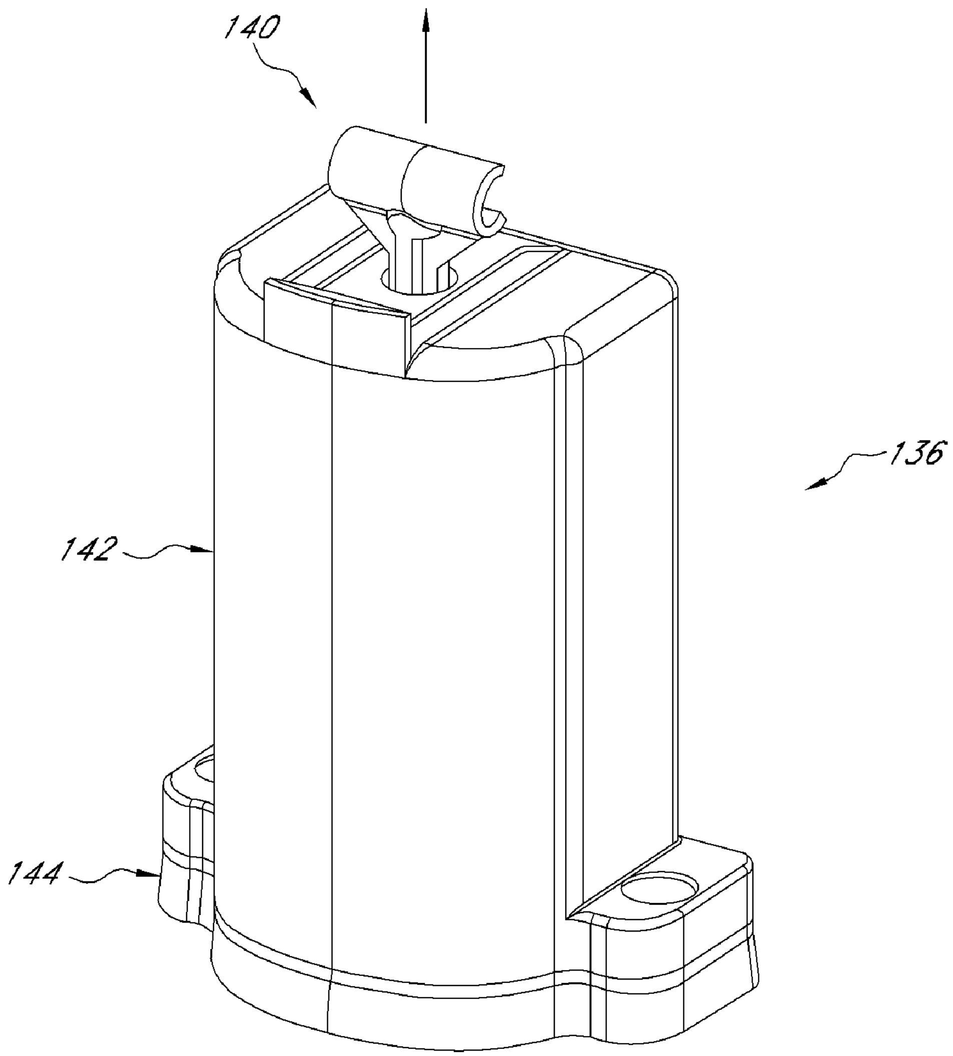
FIG. 8 is an enlarged perspective view of a drive train of the actuator shown in FIG. 7.

With reference to FIG. 8, the drive unit 136 can be configured to operate in accordance with the principle of operation of a jack screw. In some embodiments, the lifting function of the jack screw within the drive unit 136 is used to move a lifting arm 140.

As shown in FIG. 7, the lifting arm 140 can be connected to the link arms 50*c*. In some embodiments, the lifting arm 140 is not directly attached to the mechanism within the drive unit 136. Rather, the lifting arm 140 can be configured to be freely movable in the up and down direction and merely be pushed upwardly by the internal mechanism of the drive unit 136. As such, when the drive unit 136 is in the closed position, the lid 28*c* can be freely opened manually by a user.

For example, the user can insert their fingers in the recess 104 (FIG. 6) and lift the lid 28*c* upwardly, which would cause the lifting arm 140 to rise with the link arms 50*c*. This provides a further advantage in that, if there is an interruption in power from the power supply 132, for example, if the batteries are no longer operable, the lid 28*c* can be manually opened freely without interference from the drive mechanism 136.

Figure 9:
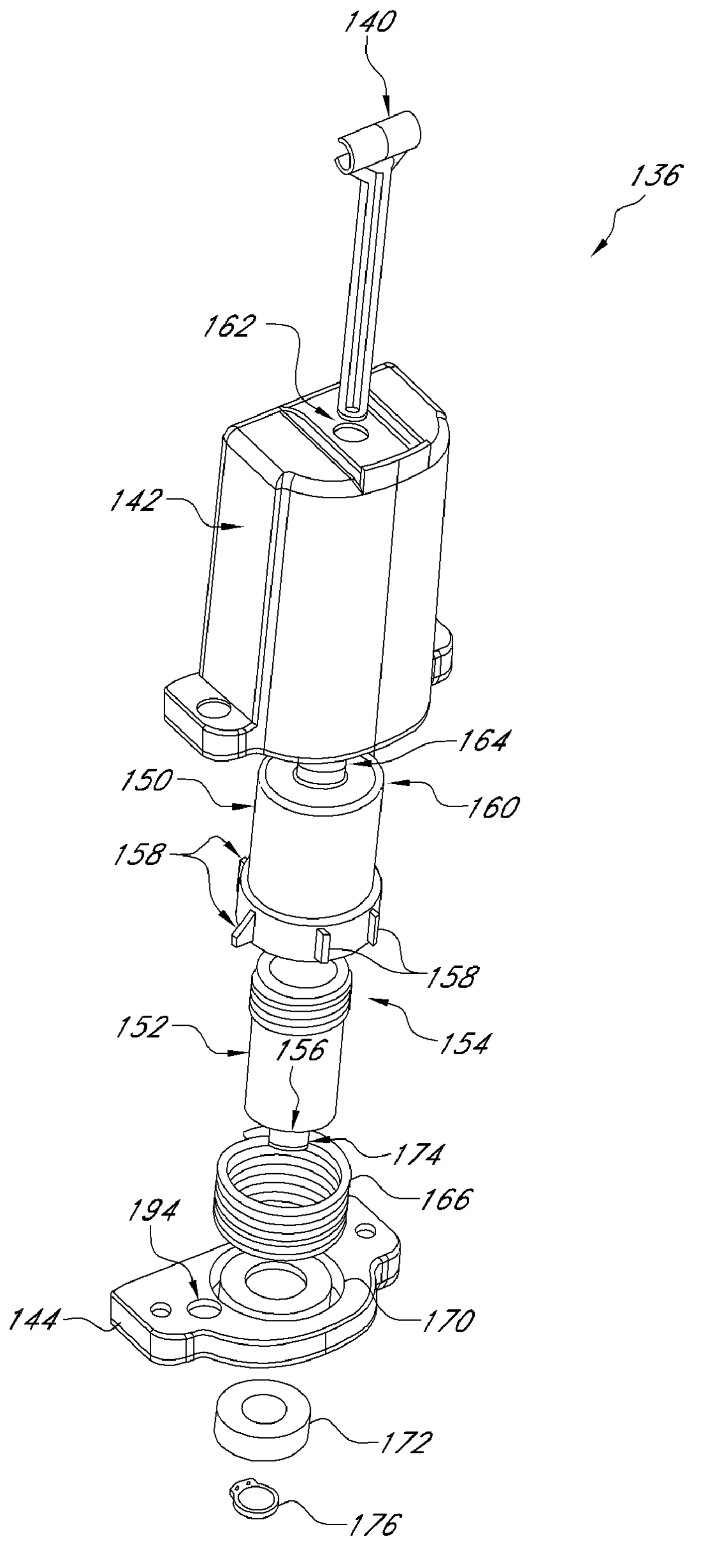
FIG. 9 is an exploded and perspective view of the drive train illustrated in FIG. 8.

In the illustrated embodiment, the drive unit 136 includes an outer housing 142 mounted to a base member 144. With reference to FIG. 9, the drive unit 136 can include a follower 150 and a screw 152. The screw 152 can include threads 154 on its outer surface. The follower 150 can include internal threads (not shown) configured to mesh with the threads 154. Optionally, Teflon® lubricant can be used to lubricate the threads 154 and the internal threads on the follower 150.

In some embodiments, the screw 152 can include a shaft connector 156 configured to engage a shaft of an actuator. Such an actuator can be any type of actuator including, for example, but without limitation, an electric motor/gear reduction unit.

In some embodiments, the follower 150 can include keys 158 configured to slide within generally vertical grooves (not shown) disposed on an interior surface of the housing 142. Thus, as the follower 150 moves upwardly and downwardly within the housing 142, the follower 150 does not rotate with the screw 152. Rather, the keys 158 follow the grooves within the housing 142 so as to maintain the angular position of the follower 150. As such, the engagement of the threads 154 with the internal threads of the follower 150 cause the follower 150 to move only vertically within the housing 142.

The upper end 160 of the follower 150 can be configured to push on the lower end 162 of the lifting arm 140. In the illustrated embodiment, the lower end 162 of the lifting arm 140 includes a hemispherical protrusion. However, other configurations can also be used.

In some embodiments, the upper end 160 of the follower 150 can include a generally hemispherical recess 164 having a shape that is generally complimentary to the hemispherical projection on the lower end 162 of the lifting arm 140. As such, the upper end 160 of the follower 150 maintains good contact with the lower end 162 of the lifting arm 140 during operation.

Optionally, the lifting mechanism 136 can include a spring 166. The spring 166 can be disposed such that an upper end of the spring 166 remains in contact with a lower end of the follower 150. As such, the spring 166 can be configured to provide a desired amount of upward bias to the lifting mechanism 136. Thus, a motor used to turn the screw 152 can use less power at least, in the initial upward movement, of the follower 150 and thus the lid 28*c*. Those of ordinary skill in the art can choose the size and strength of the spring 166 to provide the desired performance.

With continued reference to FIG. 9, the base can include a recess 170 configured to receive a portion of the spring 166. As such, the spring 166 can remain aligned with the lower portion of the follower 150.

The drive unit 136 optionally can include a bearing 172 configured to provide a generally friction less support for the screw 152. In the illustrated embodiment, the bearing 172 is configured to mate with the lower end 156 of the screw 152.

In some embodiments, the lower end 156 of the screw 152 can include a snap ring groove 174 configured to receive a snap ring 176 so as to retain the screw 152 in a proper position within the housing 142.

Figure 10:
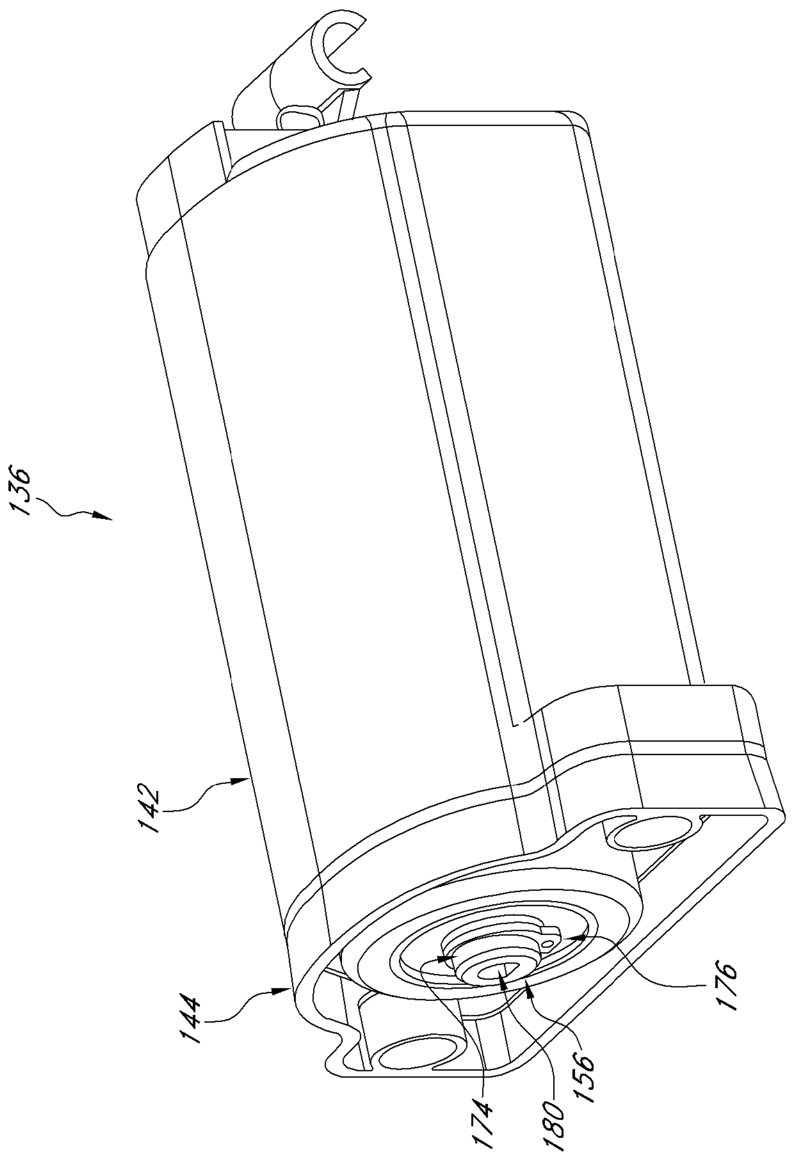
FIG. 10 is a front, bottom, and left side perspective view of the drive train unit of FIGS. 8 and 9.

For example, with reference to FIG. 10, the snap ring 176, when received within the snap ring groove 174, maintains the lower end 156 in a desired orientation protruding from a lower end of the base 144 of the housing 142.

As noted above, the lower end 156 of the screw 152 can be configured for attachment to a drive shaft of an electric actuator. In the illustrated embodiment, the lower end 156 of the screw 150 includes a cylindrical recess 180 having one flat side, the construction of which is well known in the art.

Figure 11:
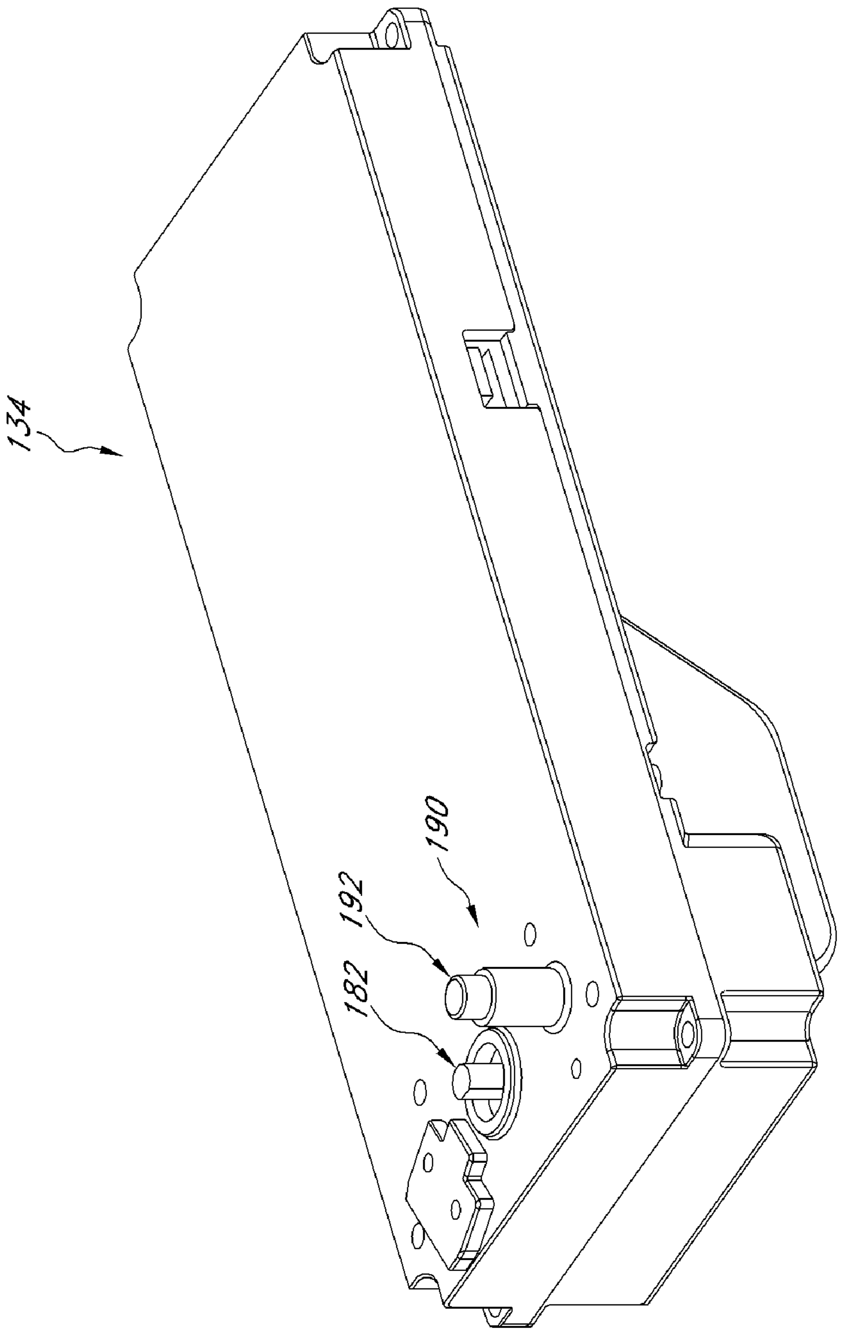
FIG. 11 is a rear, top, and right side perspective view of a controller unit of the actuator of FIG. 7.

With reference to FIG. 11, the control unit 134, in the illustrated embodiment, includes a drive shaft 182 configured to be received within the recess 180 (FIG. 10) of the drive unit 136. The control unit 134, in some embodiments, can include a position sensor arrangement 190 configured to detect a predetermined position of the lid 28*c*. In the illustrated embodiment, the arrangement 190, further details of which are described below with reference to FIG. 12, is configured to detect when the lid 28*c* is in a closed position.

In the illustrated embodiment, the sensor arrangement 190 includes a plunger 192 extending upwardly from the control unit 134. The plunger 192 is aligned relative to the drive shaft 182 to extend through an aperture 194 (FIG. 9) in the base 144. The aperture 144 is positioned so as to be aligned with one of the keys 158 of the follower 150. In some embodiments, one of the keys 158 can be enlarged so as to ensure contact with the plunger 192 when the follower 150 is in a position corresponding to a closed position of the lid 28*c* (i.e., a lowermost position of the follower 150).

Thus, during operation, when the key 158 contacts and depresses the plunger 192, the control unit 134 can determine that the lid 28*c* is closed or at least that the follower 150 is in a position corresponding to a closed position of the lid 28*c*.

Figure 12:
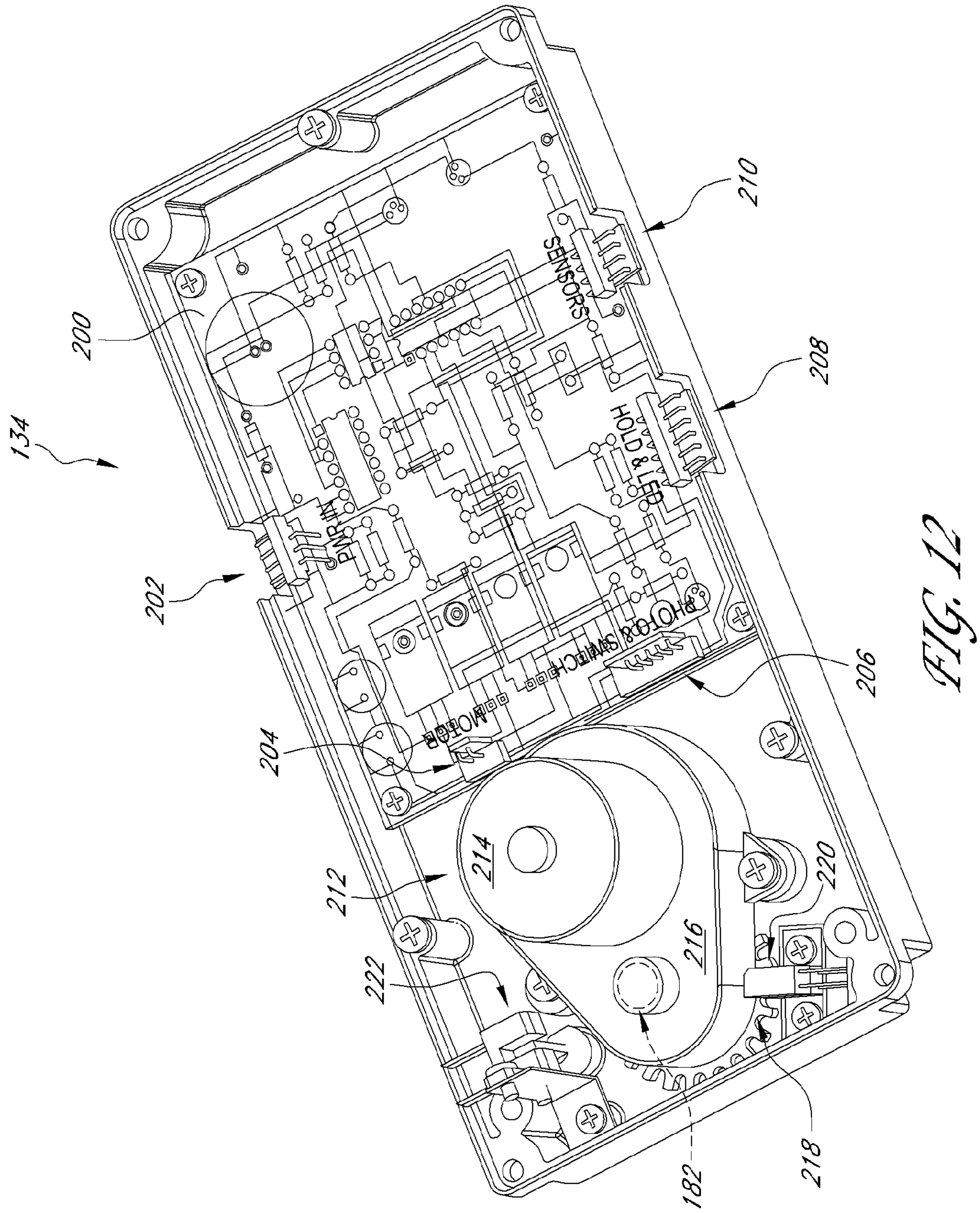
FIG. 12 is a bottom, rear, and left side perspective view of the control unit of FIG. 11 with a bottom cover member removed showing internal components, including an electronic controller and an electric drive motor.

FIG. 12 illustrates further detail within the control unit 134. In the illustrated embodiment, an electronic control unit (ECU) 200 is mounted within the control unit 134. The ECU 200 can include connectors allowing the ECU 200 to be connected to various devices, for example, but without limitation, a power supply, an electric motor, various sensors, and user inputs. In the illustrated embodiment, the ECU 200 includes a power input port 202, a motor control port 204, a lid position sensor input port 206, a user interface port 208, as well as a port 210 for other sensors. However, other ports and arrangements can also be used.

In the illustrated embodiment, the control unit 134 also includes a combined electric motor and gear reducer set 212. The motor and gear reducer set 212 can comprise an electric motor 214 and a gear reduction device 216. However, other configurations can also be used. These types of motor and gear reducer units 212 are widely commercially available. Thus, the power of the motor 214 and the ratio of the gear reduction device 216 can be chosen by the designer to provide the desired performance.

The control unit 134 can also include an encoder wheel 218 attached to the output shaft 182 of the unit 212. The encoder wheel 218 can include a plurality of teeth disposed around its periphery so as to provide a reference for rotation of the shaft 182.

The control unit 134 can also include a sensor 220 configured to detect movement of the encoder wheel 218. For example, but without limitation, the sensor 220 can comprise a pair of devices, including a light emitter and a light receiver, arranged such that the teeth of the encoder wheel 218 intermittently block the reception of the light from the light emitter to the light receptor as the encoder wheel 218 turns. This type of sensor and encoder wheel arrangement is well known in the art.

In the control unit 134, the encoder wheel 218 and sensor 220 arrangement provides a reference for the control unit 134 to determine the location of the lid 28*c*. For example, the ECU 200 can receive a signal from the sensor arrangement 220 to determine the number of rotations of the shaft 182. The number of rotations of the shaft 182 can be correlated directly to vertical movement of the follower 150 because the pitch of the teeth of the threads 154 can be known in advance, and thus be used as a basis for correlating rotation of the shaft 182 to vertical movement of the follower 150. As such, the ECU 200 can be configured to determine the position of the lid 28*c* based on the signal from the sensor arrangement 220.

The control unit 134 can also include a sensor 222 configured to detect when the plunger 192 (FIG. 11) is depressed by one of the keys 158. For example, the sensor 222 can be in the form of a simple limit switch configured to output a detection signal when the plunger 192 is depressed. As such, the ECU 200 can receive a signal from the sensor 222 so that the ECU 200 can confirm when the lid 28*c* is closed or at least when the position of the follower 150 corresponds to a closed position of the lid 28*c*.

As noted above with reference to the circuit board 40, the ECU 200 can comprise a hard wired circuit to perform the functionality described below. In some embodiments, the ECU 200 can comprise a processor and a memory for storing a control routine for performing the functionality described below. Additionally, it is to be noted that the illustrated arrangement of the control unit 134 is merely exemplary. Any other arrangement can also be used.

Figure 13:
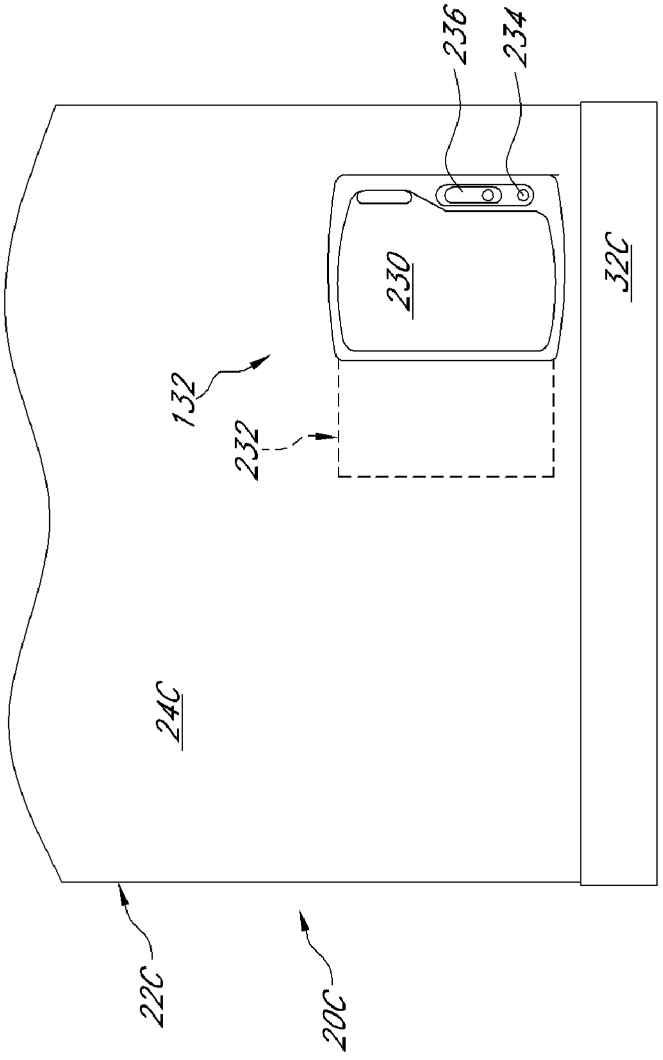
FIG. 13 is a rear elevational view of a lower portion of the trash can of FIGS. 6-12 illustrating a battery compartment, a power switch, and an AC electric power supply port.

FIG. 13 illustrates an exemplary arrangement of the power supply 132. As shown in FIG. 13, the power supply 132 can include a door 230 configured to provide access to an interior battery compartment 232. In this arrangement, the door 230 can be designed to be as small as possible, providing at least enough clearance to allow batteries to be inserted into the interior battery compartment 232. This provides a more aesthetic appearance. In some embodiments, the battery compartment 232 is configured to receive four (4) "D" batteries. However, other numbers and sizes of batteries can also be used.

Additionally, the power supply 132 can include a power input port 234. As such, the power supply 132 can be provided with electrical power from household power supply. In some embodiments, the power input port 234 is a direct current (DC) input port configured to receive a direct current from an AC to DC converter device. Such devices are well known in the art.

Additionally, the power supply 132 can include a main power switch 236 configured to allow the power supply 132 to be turned on or off as desired by a user.

Figure 14:
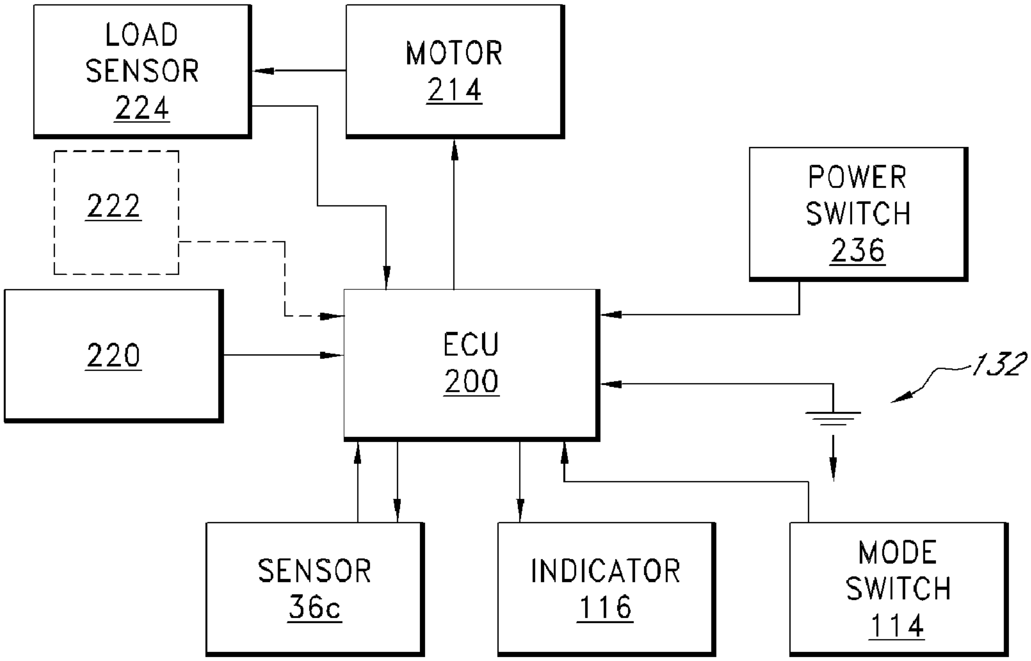
FIG. 14 is a schematic diagram of an electronic drive unit for opening the lid of the trash can of FIGS. 6 and 7.

FIG. 14 schematically illustrates connections between the ECU 200 and the various devices described above. During operation, the ECU 200, as noted above, can be powered by the power supply 132.

Additionally, the ECU 200 can provide power to the sensor 36*c* (FIG. 7) for powering the light emitting portion 120 of the sensor 36*c* to create a light beam 124 which is received by the light receiving portion 122. Additionally, as noted above, the ECU 200 can be configured to periodically power the sensor 36*c* so as to reduce the amount of energy used for powering the sensor 36*c*.

Further, as noted above, the sensor 36*c* can be configured to emit a detection signal to the ECU 200 when it is determined that the beam of light 124 has been blocked. For example, the beam of light 124 can be blocked when a user inserts their foot or other non-transparent body into the recess 30*c*, thereby preventing the beam of light 124 from striking the light receiving portion 122 of the sensor 36*c*. In some modes of operation, the ECU 200 can be configured to drive the motor 214 when a detection signal from the sensor 36*c* is received. When the motor 214 is driven, the shaft 182 (FIGS. 11 and 12) is rotated. The shaft 182, being received within the recess 180 (FIG. 10) of the screw 152 (FIG. 9) thereby rotates the screw 152.

With continued reference to FIG. 9, as the screw 152 rotates, it is supported by the bearing 172 and due to the snap ring 176, the screw 152 is maintained in its vertical position within the housing 142. However, because the follower 150 includes internal threads meshed with the external threads 154 of the screw 152, the follower 150 is pushed upwardly (as viewed in FIGS. 9 and 7). Additionally, because the keys 158 are received within grooves (not shown) on the interior of the housing 142, the follower 150 does not rotate in the direction of rotation of the screw 152. Rather, the angular position of the follower 150 is maintained by the keys 158 and thus, the follower 150 rises within the housing 142.

As the follower 150 rises within the housing 142, it pushes upwardly against the lifting arm 140. As shown in FIG. 7, the upper end of the lifting arm 140 is connected to the connecting links 50*c*, and thus the lifting arm 140 pushes the links 50*c* upwardly. With reference to FIG. 6, as the link rods 50*c* are pushed upwardly, the upper ends of the link rods 50*c* push against the bracket assemblies 51*c*, and thereby rotate the lid 28*c* toward an open position.

With reference again to FIGS. 12 and 14, as the shaft 182 rotates, the teeth of the encoder wheel 218 pass through the sensor arrangement 220. As shown in FIG. 14, the signal from the sensor 220 is transmitted to the ECU 200.

In some embodiments, the ECU 200 can be configured to determine when the lid 28*c* reaches its maximum open position based on the signal from the sensor 220. For example, but without limitation, the ECU 200 can be configured to count the number of pulses it receives from the sensor 220, each pulse representing one tooth of the encoder wheel 218 passing the sensor 220, to determine the number of rotations of the shaft 182 from the beginning of the actuation of the electric motor 214. The number of pulses generated by the movement of the lid 28*c* from the closed position to the open position can be determined and stored within the ECU 200 as a reference value. Thus, the ECU 200 can count the pulses from the beginning of the actuation of the motor 214 and then stop the motor 214 when the ECU 200 receives the stored number of pulses from the sensor 220.

The ECU 200 can be configured to perform in a number of different ways. For example, firstly, the ECU 200 can be configured to open and close the lid 28*c* in accordance with the description set forth above with reference to FIGS. 3A, 3B, and 3C. However, the ECU 200 can be programmed to open the lid 28*c* in other manners.

In some embodiments, the ECU 200 can be configured to activate the indicator 116 while the lid 28*c* is in motion. For example, the ECU 200 can be configured to cause the indicator light 116 to blink whenever the motor 214 is turning. However, the ECU 200 can be configured to actuate the indicator light 116 in any other time for any other reason.

The ECU 200 can also be configured to operate in other modes, according to the actuation of the mode switch 114. For example, the ECU 200 can be configured to maintain the lid 28*c* in an open position indefinitely if the mode switch 114 is depressed. For example, if a user causes the ECU 200 to raise the lid 28*c*, for example, by inserting their foot into the recess 30*c* (FIG. 7), and then the user actuates the mode switch 114 (FIG. 6), then the ECU 200 can enter an open mode in which the ECU 200 does not operate the motor 214 to close the lid 28*c*. Rather, the motor is not actuated until the mode switch 114 is actuated again.

While the ECU 200 is in this mode, the ECU 200 can also cause the indicator 116 to flash, change color, or provide another indication so that the user can be advised that the trash can 20*c* is in a mode in which the lid 28*c* will remain open indefinitely. Thus, in some embodiments, the indicator light 116 can comprise a multicolored LED that can change colors, remain on in any one of the various colors indefinitely, blink, or turn off. Such LED lights are widely commercially available.

When closing the lid 28*c*, the ECU 200 can also rely on the output of the sensor 220 to determine when the lid 28*c* has reached its closed position. However, the ECU 200 can optionally be configured to detect an output from the sensor 222 for determining when the lid 28*c* is closed. Thus, for example, when the ECU 200 drives the motor 214 to close the lid 28*c*, the ECU 200 can continue to provide power to the motor 214 until a detection signal is received from the sensor 222. At that time, the ECU 200 can stop directing power to the motor 214 because the signal from the sensor 222 indicates the lid 28*c* is closed.

This provides a further recalibration of the ECU 200 each time the lid 28*c* is closed. For example, because the ECU 200 is not relying solely on the output of the sensor 220 and the proper rotation of the encoder wheel 218, errors associated with the encoder wheel 218 can be avoided.

The trash can 20*c* can also include a load sensor 224 configured to detect the voltage applied to the motor 214. The load sensor 224 can be configured to output a signal that is continuous and proportional to the voltage applied to the motor 214. In some embodiments, the load sensor 224 can be configured to output a signal only when the voltage applied to the motor 214 exceeds a predetermined value. In either configuration, whether the ECU 200 is configured to determine whether or not the output of the load sensor 224 is above a predetermined value, or whether the load sensor 224 is configured to output a signal only when the voltage applied to the motor 214 exceeds a predetermined value, the ECU 200 can be configured to stop operation of the motor 214 if such a signal or state is detected.

This arrangement provides a further advantage in that the ECU 200 can determine if the motor 214 is overloaded. This can happen when, for example, a user has left a heavy object on top of the lid 28*c*. If this happens, and the ECU 200 energizes the motor 214 so as to raise the lid 28*c*, the motor 214 can be overloaded. Thus, by providing a load sensor 224, or any other sensor that can provide a similar functionality, the ECU 200 can terminate operation of the motor 214 to prevent damaging the motor 214.

As noted above, the power switch 236 can be used to terminate the supply of power to the control unit 134 and thus the ECU 200. This can be useful in households with small children who may attempt to play with the trash can 20*c* and thus waste energy. Thus, an owner of the trash can 20*c* may decide to occasionally turn off the control unit 134 by activating the power switch 236. With the power switch 236 disposed on a back side (FIG. 13) of the trash can 20*c*, small children are less likely to discover the location of the power switch.

The electronic drive unit of FIG. 14 can include a motor 214. The motor 214 can be a simple brush series DC motor nominally rated for 6 volt operation. The motor 214 can be driven by an "H" bridge transistor/MOSFET hardware configuration which allows for bi-directional drive. The motor drive signals can be issued from a microcontroller (model # PIC 16F685), which can be incorporated into the ECU 200. As such speed control can be achieved by varying the duty-cycle to the motor. Motor voltage is the raw-battery voltage as switched through the transistors.

To achieve precision control of the motor 214 for purposes of positioning the lid 28*c*, encoder wheel 218 rotates through an optical interrupt sensor pair 220. Another interrupter 222 can be used to detect when the lid is in the home or bottom position.

The ECU 200 can also include SuperCap technology to allow the microcontroller to ride out supply dips and transients during low battery voltage. This allows for better utilization of available battery energy. The SuperCap devices are well known in the art and are not further described herein.

In the non-limiting exemplary embodiments where the PIC 16F685 microprocessor is used, the following functions can be supported, although other controllers can also be used for supporting the following functions: (1) Motor bi-directional drive, (2) Interaction with the user (detecting switches, pulse LEDs, detecting IR beam interruption), (3) Logic for driving the lid 28*c* up or down, (4) preventing the lid from exceeding the maximum up position, (5) homing the lid for establishing position reference.

As noted above, the ECU 200 can include modules for controlling various aspects of the operation of the electronic drive unit. The modules described below with reference to FIGS. 15-21 are described in the format of flow charts representing control routines that can be executed by the ECU 200. However, as noted above, these control routines can also be incorporated into hard-wired modules or a hybrid module including some hard-wired components and some functions performed by a microprocessor.

Figure 15:
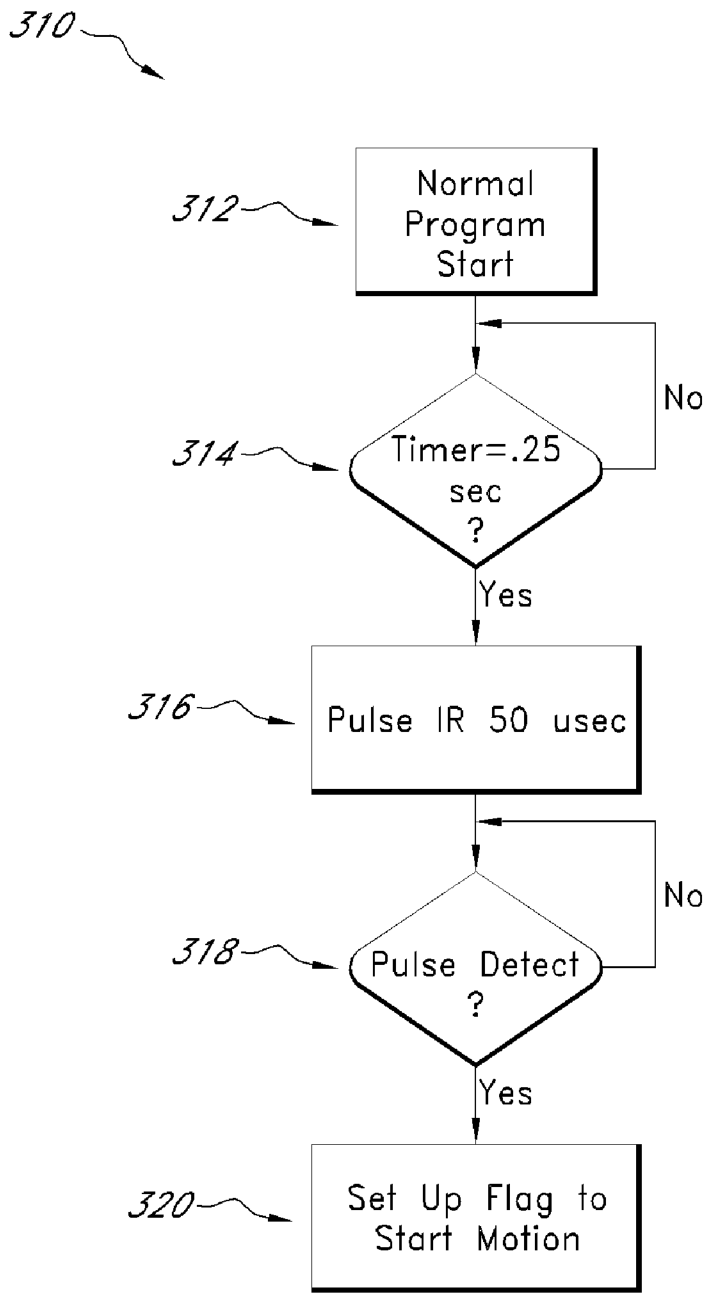
FIG. 15 is a flow chart illustrating a control routine for controlling the actuation of sensors and which can be used with the electronic drive unit of FIG. 14.

With reference to FIG. 15, the control routine 310 can be used to control the actuation of the sensor 36 (FIG. 1), 36*c* (FIG. 14), or any other sensor. The control routine 310 is configured to periodically activate the sensor 36, 36*c* so as to reduce power consumption. Although only sensor 36*c* is referenced below, it is to be understood that any sensor or combination of sensors can be controlled to reduce power consumption.

For example, the control routine 310 can begin operation at an operation block 312. For example, in the operation block 312, the control routine 310 can be started when batteries are inserted into the battery compartment 232, when the power switch 236 is moved to an on position, or at any other time. After the operation block 312, the routine 310 moves on to a decision block 314.

In the decision block 314, it can be determined whether a timer has reached a predetermine time interval. For example, the ECU 200 can include a timer and, initially setting a timer counter value to zero, determine whether the timer has reached, a predetermined time interval, such as, for example, one quarter of one second. However, other time intervals can also be used.

If, in the decision block 314, the timer has not reached the predetermined time interval, the routine 300 returns and repeats. On the other hand, if in the decision block 314, the timer has reached the predetermined time interval, the routine 310 moves on to an operation block 316.

In the operation block 316, a sensor can be activated. For example, the ECU 200 can activate the sensor 36*c*.

In some embodiments, a further advantage can be achieved by activating the sensor 36*c* for a period of time shorter than the predetermined time interval used in the decision block 314. For example, in some embodiments, the sensor 36*c* is activated for a predetermined time of about 50 microseconds. However, other time periods can also be used.

With the activation time period of the operation block 316 being shorter than the predetermined time interval, the sensor 36*c* is not continuously operating. Thus, the power consumption of the sensor 36*c* can be reduced. In the exemplary embodiment in which the predetermined time interval of decision block 314 is about one-quarter of a second and the activation time period of activation block 316 is 50 microseconds, the sensor 36*c* is only operating about 0.02 percent of the time, and a user will only have to wait about one-quarter of a second, at the most, before the ECU 200 will detect the activation of the sensor 36*c*.

After the operation block 316, the routine 310 moves on to a decision block 318.

In the decision block 318, it can be determined whether a pulse is detected by the sensor 36*c*. For example, the ECU 200 can be configured to observe the output from the sensor 36*c* for any interruption of the signal. More specifically, the sensor 36*c*, as described above, can include a light-emitting portion 120 and a light-receiving portion 122 (FIG. 7). The ECU 200 can be configured to compare the actuation of the emitter 120 with the signal output from the receiver 122. If there is an interruption, the ECU 200 can determine that a pulse, or an interruption of the light beam 124, has been detected.

If, in the decision block 318, a pulse has not been detected, the routine 310 can return and repeat. Optionally, in some embodiments, the routine can return to decision block 314 to repeat, although this return is not illustrated in FIG. 15. On the other hand, if it is determined that a pulse has been detected in decision block 318, the routine 310 can move on to operation block 320.

In the operation block 320, the ECU 200 can be triggered to begin operation of the motor 214 to open or close the lid. For example, if the lid 28*c* is in the down position, the motor 214 can be operated to open the lid. If, on the other hand, the lid 28*c* is in the open position, the motor 214 can be operated to close the lid 28*c*.

Figure 16:
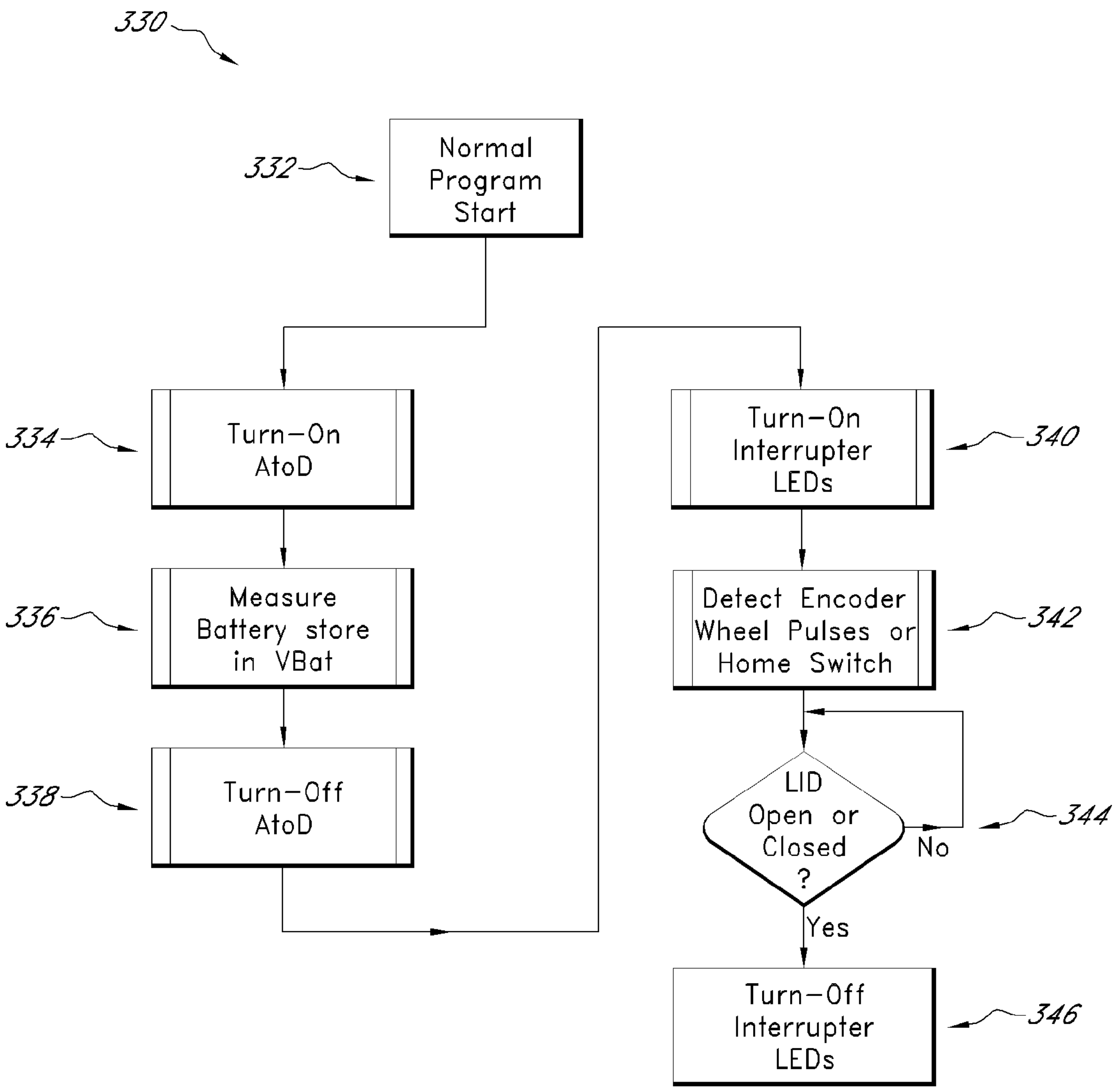
FIG. 16 is another control routine for controlling the detection of battery voltages and activation of sensors that can also be used with the electronic drive unit illustrated, in FIG. 14.

With reference to FIG. 16, a control routine 330 can be configured to activate certain components of the electronic drive unit of FIG. 14. For example, the routine 330 can begin at operation block 332 at any time. In some embodiments, the operation block 332 can begin the control routine 330 when the ECU 200 detects an interruption of the light beam 124. For example, but without limitation, the routine 330 can begin an operation in the operation block 332 if the routine 310 of FIG. 15 reaches the operation block 320. After the operation block 332, the routine 330 moves on to an operation block 334.

In the operation block 334, an analog-to-digital converter (not shown) can be activated. For example, the electronic drive unit of FIG. 14 can include an analog-to-digital converter disposed across the power supply 132. This analog-to-digital converter can convert the voltage of the power source 132 to a digital signal so that it can be read by the ECU 200. After the operation block 334, the routine 330 can move on to an operation block 336.

In the operation block 336, the battery voltage signal generated in operation block 334 can be stored in a memory device. For example, the ECU 200 can detect the signal generated by the analog-to-digital converter which is indicative of the voltage of the power supply 132 and store that voltage in a memory device as VBat. After the operation block 336, the routine 330 can move on to an operation block 338.

In the operation block 338, the analog-to-digital converter can be powered off. After the operation block 338, the routine 330 can move on to an operation block 340.

In the operation block 340, the sensors 220, 222 (FIG. 12) can be activated. The sensors 220, 222, as noted above, are configured to detect pulses generated by rotation of the encoder wheel 218 and movement of the plunger 192, respectively.

After the operation block 340, the routine 330 can move on to an operation block 342.

In the operation block 342, the output of the sensors 220, 222 can be used for control of the electronic drive unit of FIG. 14. For example, the ECU 200 can detect the output of the sensors 220, 222 for use in controlling the motor 214, described in greater detail below with reference to FIGS. 17-19. After the operation block 342, the routine 330 can move on to a decision block 344.

In the decision block 344, it can be determined whether the lid 28*c* is opened or closed. For example, the ECU 200 can be configured to count pulses from the sensor 220, during an opening movement of the lid 28*c*, to determine if the lid 28*c* has reached the open position. On the other hand, the ECU 200 can also be configured to detect actuation of the sensor 222. When the sensor 222 is activated, the ECU 200 can determine that the lid is closed. If the determination in decision block 344 is that the lid 28*c* is not open or closed, the routine 330 returns and repeats.

However, if the determination in decision block 344 is that the lid is open or closed, the routine 330 moves on to operation block 346. In the operation block 346, the sensors 220, 222 can be turned off.

The routine 330 can provide additional advantages. For example, because the analog-to-digital converter is only operated briefly to take a battery voltage reading, the analog-to-digital converter does not consume excessive amounts of power unnecessarily. Similarly, because the sensors 220, 222 are only activated when the lid 28*c* is being moved, and then turned off when the lid is opened or closed, the sensors 220, 222 also consume less power.

Figure 17:
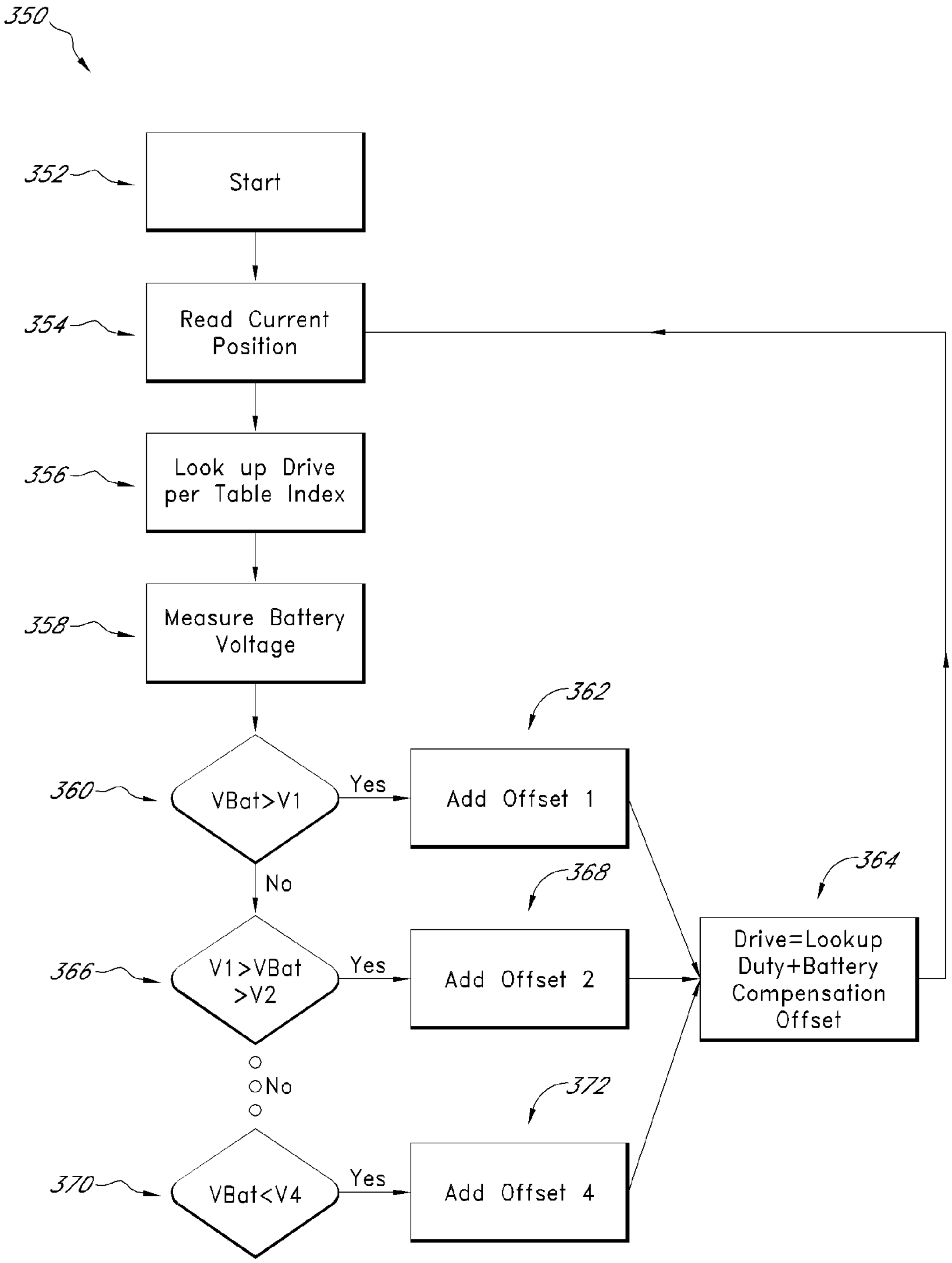
FIG. 17 is a flow chart illustrating a control routine for controlling the actuation of an electric motor of the electronic drive unit of FIG. 14.

With reference to FIG. 17, a control routine 350 can also be used to control operation of the electronic drive unit of FIG. 14. The control routine 350 can be configured to vary the operation of the motor 214 to achieve a desired movement characteristic of the lid 28*c*. For example, the routine 350 can be used to vary the drive signal, e.g., duty cycle of the power signal to the motor 214, to achieve a desired motion characteristic of the lid 28*c*. However, other techniques can also be used to vary the operation of the motor 214. In some embodiments, the routine 350 is designed to achieve a substantially constant speed movement of the lid 28*c* in at least one of the opening movement and closing movement of the lid 28*c*. However, other movement characteristics can also be achieved.

The control routine 350 can begin in an operation block 352. For example, the operation block 352 can allow the routine 352 to continue when the routine 310 (FIG. 15) reaches the operation block 320. After the operation block 352, the routine 350 can move on to an operation block 354.

In the operation block 354, the position of the lid 28*c* can be determined. For example, the ECU 200, as noted above with reference to the routine 330, can monitor the output of the sensor 220 to determine a position of the lid 28*c*. For example, but without limitation, the ECU 200 can count the pulses from the sensor 220. As noted above, the sensor 220 creates an interrupt signal as the teeth on the encoder wheel 218 pass by the sensor 220. Additionally, the position of the lid 28*c* can be correlated to the number of pulses output by the sensor 220.

For example, the number of pulses generated by the sensor 220 can be correlated to an angular position of the lid 28*c*. Thus, the position of the lid 28*c* during either an upward opening movement or closing movement can be determined by counting the pulses form the sensor 220. However, other techniques for determining the position of the lid 28c can also be used. After the operation block 354, the routine 350 can move onto an operation block 356.

In the operation block 356, a drive value for operating the motor 214 can be determined. For example, the ECU 200 can determine the desired output of the motor 214 based on the position of the lid 28c determined in operation block 354. In some embodiments, the desired power output of the motor 214 as a function of the position of the lid 28c can be determined beforehand and stored in a data table or map.

Figure 18:
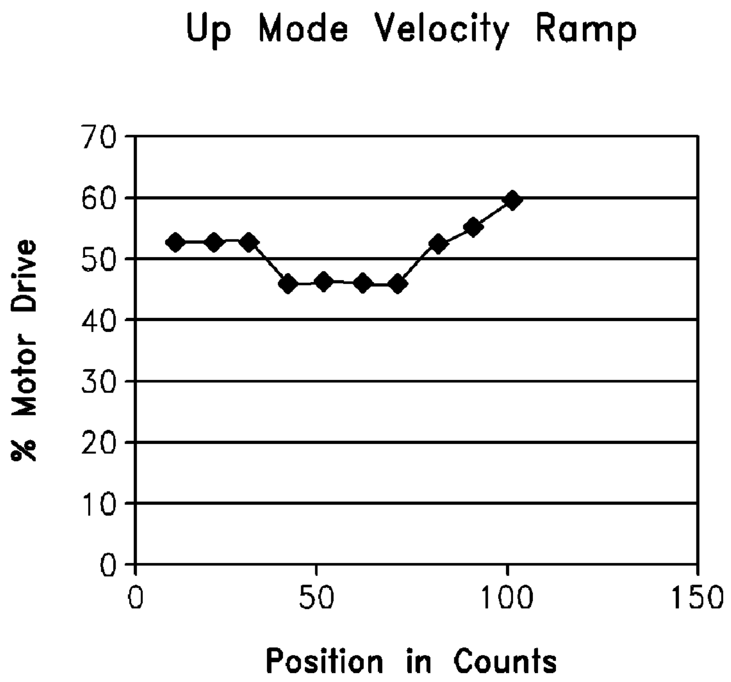
FIG. 18 is a graph illustrating predetermine electric motor drive data that can be used for operating the electric motor of the electronic drive unit of FIG. 14.

FIG. 18 illustrates a sample data table that correlates the target output or target drive signal of the motor 214 to a position of the lid 28c. In the illustrated embodiment of the table of FIG. 18, the vertical axis represents a percentage of the maximum power output of the motor 214. The horizontal axis represents the position of the lid 28c in terms of counts or pulses issued from the sensor 220. However, this is merely one type of data table that can be used.

The data table of FIG. 18 represents an exemplary but non-limiting embodiment of motor drive data that can be used when the lid is moved toward an opening position.

Figure 19:
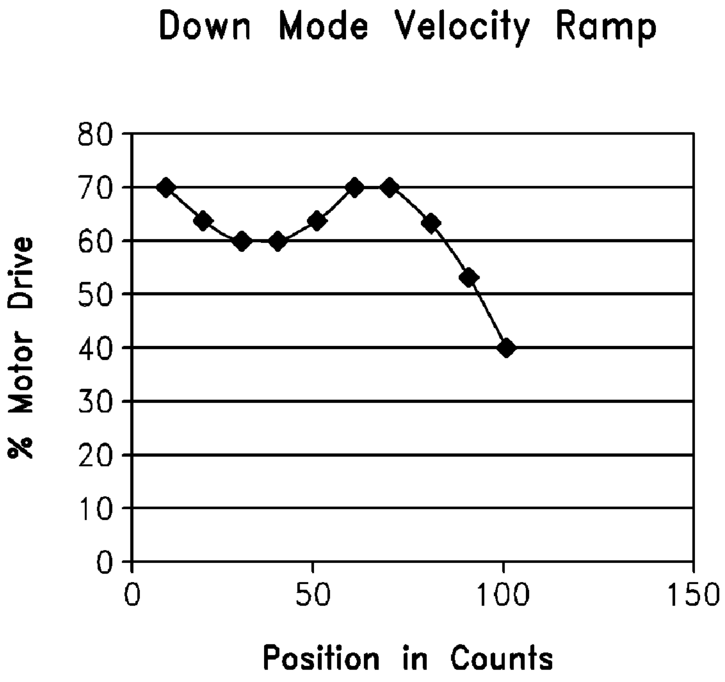
FIG. 19 is another graph illustrating other data that can be used for controlling the electric motor of the electronic drive unit of FIG. 14.

Similarly, FIG. 19 illustrates data that can be used to operate the motor 214 when the lid 28c is being moved from an open to a closed position. The determination of the desired output of the motor 214 for moving the lid 28c in each of the opening and closing movements depends on various factors. For example, these factors can include the geometry of the lid 28c, the weight of the lid 28c, the geometry of the rods 50c, the characteristics of the gear reduction device 216, the resistance and gear reduction ratio achieved by the unit 136 (FIG. 9) and the strength of the spring 166.

Additionally, the motor drive values represented in FIGS. 18 and 19 can be adjusted to achieve the desired opening or closing characteristics of the lid. For example, as noted above, the values of FIGS. 18 and 19 are designed to achieve a generally constant angular velocity of the lid 28c during both opening and closing movements. Additionally, these values are designed to achieve about the same velocity of the lid 28c during both opening and closing movements of the lid 28c. However, other movement characteristics can also be achieved.

With reference again to FIG. 17, after the operation block 356, the routine 350 can move on to an operation block 358.

In the operation block 358, the voltage of the power supply 132 can be determined. For example, the ECU 200 can read the voltage detected in operation block 336 of routine 330 (FIG. 16). However, optionally, the ECU 200 could reactivate the analog-to-digital converter and take a new reading of the voltage of the power supply 132. Other techniques can also be used.

After the operation block 358, the routine 350 can move on to a decision block 360.

In the decision block 360, it can be determined whether the voltage of the power supply 132 is greater than a first predetermined voltage threshold V1. The predetermined voltage V1 can be any voltage.

In some embodiments, the voltage V1 is set at a voltage that corresponds to a substantially fully charged state of the power supply 132, for example, where the power supply 132 is a disposable or rechargeable battery. Thus, for example, if the power supply 132 comprises six D cell batteries, each rated at 1.5 volts, the fully-charged state of the power supply 132 would be about 9.0 volts. However, as is well known in the art, fully charge D cell batteries often carry a voltage of about 1.6 volts when they are fully charged and brand new.

Thus, the voltage V1 can be 9 or 9.6 volts depending on the level of accuracy desired. In other words, as described below, the voltage VBat of the power supply 132 can be compared to several additional voltage thresholds. The more voltage thresholds that are used, the more accurately the electronic drive unit of FIG. 14 will maintain a uniform angular velocity of the opening and closing of the lid 28c.

With continued reference to the decision block 360, if it is determined that the voltage VBat of the power supply 132 is greater than the first predetermined voltage threshold V1, the routine 360 can move on to an operation block 362.

In the operation block 362, an offset value can be determined. For example, the offset value Offset 1 can be predetermined to achieve a desired opening or closing speed of the lid 28c. In some embodiments, the magnitude of the value Offset 1 can be the largest of all the offset values.

For example, in some embodiments, the value of Offset 1 can be −30%. As such, when the voltage VBat of the power supply 132 is at its greatest value, the largest (negative) offset is applied. As such, as the voltage VBat of the power supply 132 drops over time, smaller (negative) offset values can be applied to thereby achieve a substantially uniform opening and closing speed of the lid 28c, as voltage of the power supply 132 discharges over time. After the operation block 362, the routine 350 can move on to operation block 364.

In the operation block 364, the drive value determined in operation block 356 is added with the offset value, and at this point of the operation of the routine 350, the offset value is Offset 1. Thus, in an exemplary embodiment, where the value of Offset 1 is (−30%), the drive value determined in operation block 356 is reduced by 30%. Thus, in the operation block 364, the motor 214 is driven at this resulting drive value.

With regard to the drive value applied to the motor 214, the power output from the motor 214 can be varied in any known way. For example, where the drive signal applied to the motor 214 is a duty cycle, characteristics of the duty cycle can be varied to achieve a varying power output of the motor 214. For example, but without limitation, the pulse width of the duty cycle applied to the motor 214 can be increased to increase the output of the motor 214 and can be decreased to decrease the power output from the motor 214. However, there is a maximum point of adjustment for an electric motor, such as the motor 214. Thus, the maximum adjustment allowed by the technique used to adjust the power output of the motor 214, would be considered a 100% drive value.

Finally, in the operation block 364, the drive value is determined by adding the offset value, in this case Offset 1, with the drive value determined in operation block 356, and this drive value is supplied to the motor 214. After the operation block 364, the routine 350 returns to operation block 354 and repeats.

Returning to decision block 360, if it is determined that the voltage VBat of the power supply 132 is not greater than the voltage V1, the routine moves on to a decision block 366.

In the decision block 366, it can be determined whether the voltage VBat is less than the voltage V1 and greater than another predetermined voltage threshold V2. As noted above, with regard to the description of the voltage V1, the voltage V2 can be set at a voltage indicative of a voltage normally reached by a power supply formed with a set of battery cells as a discharge but are still useful. If, it is determined in the decision block 366, that the voltage VBat is less than voltage V1 but greater than voltage V2, the routine can move on to an operation block 368.

In the operation block 368, another offset value can be determined. For example, in the operation block 368, the offset can be determined as Offset 2. In an exemplary but nonlimiting embodiment, the magnitude of Offset 2 can be −20%. As such, as noted above, as the voltage of the power supply 132 drops, the magnitude of the offset value drops (to a smaller negative value) thereby compensating for the decreasing voltage of the power supply 132. After the operation block 368, the routine 350 can move to the operation block 364 and continue as described above.

With reference again to the decision block 366, if the determination therein is negative, the routine can move on to other decision blocks. There can be any number of decision blocks similar to the decision blocks 360, 366, depending on how many steps or stages of the discharge state of the power supply 132 are contemplated.

Decision block 370 represents an exemplary final decision block that can be used in this series. In the decision block 370, it can be determined whether the voltage VBat of the power supply 132 is below a final reference voltage V4. The final reference voltage V4 can be a voltage below which there is very little useful power left in the power supply 132, and shut down of the ECU 200 is imminent. However, other reference voltages can also be used. If, in the decision block 370, it is determined that the voltage VBat is less than the reference voltage V4, the routine moves on to an operation block 372.

In the operation block 372, a final offset value Offset 4 can be determined. In some exemplary, but nonlimiting embodiments, the offset value Offset 4 is 0%. Thus, for example, the full value of the drive value determined in the operation block 356 is applied to the motor 214, in the operation block 364. However, in some embodiments, the value of Offset 4 can be a value that would result in a 100% value for the drive value.

For example, with reference to FIG. 19, the maximum drive value applied is 70%. Thus, in some embodiments, the value of Offset 4 in operation block 372 can be +30%. Thus, when the maximum value of 70% from the table of FIG. 19 is added to this exemplary value of 30% being the value of Offset 4, the resulting drive value is 100%. Again, as noted above, the values of the various offsets used in the operation block 362, 368, 372, can be set so as to achieve a substantially constant closing and opening speed of the lid 28*c*, regardless of the voltage of the power supply 132.

Eventually, as the voltage of the power supply 132 continues to drop, the ECU 200 will eventually shut down, despite the use of a SuperCap device described above.

Figure 20:
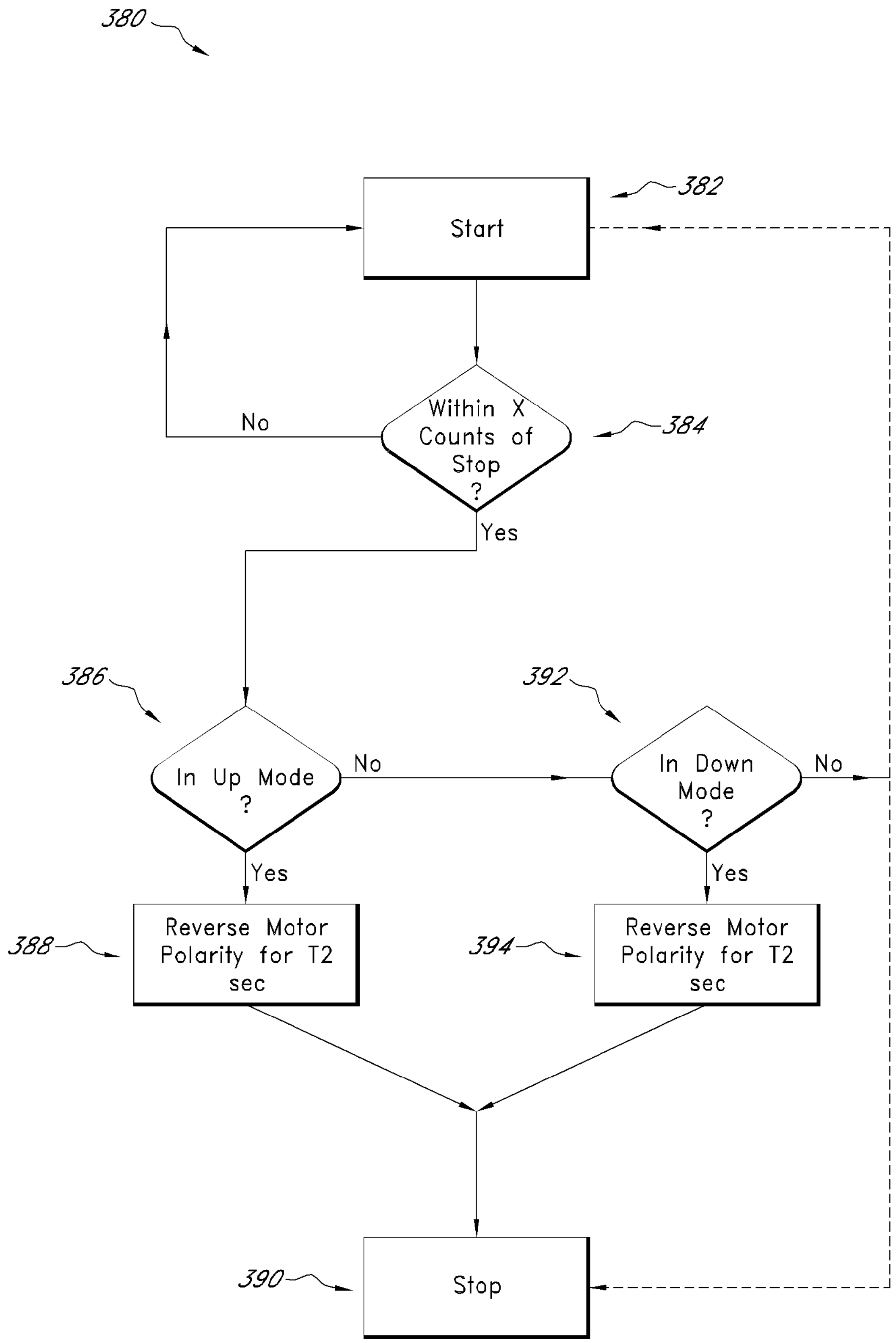
FIG. 20 is a flow chart illustrating a control routine that can be used for controlling the operation of the electronic drive unit of FIG. 14.

FIG. 20 illustrates a control routine 380 that can also be used to control the operation of the electronic drive unit of FIG. 14. The routine 380 can be used for braking or slowing the movement of the lid 28*c* as it nears a point at which it is desired to stop the lid 28*c*.

The routine 380 can begin in operation block 382. The operation block 382 can be configured to allow the control routine 380 to continue at any time. In some embodiments, the operation block 382 can be configured to allow the routine 380 to continue if it is determined that the lid 28*c* or the motor 214 is already in motion. However, other determinations can also be used. After the operation block 382, the routine 380 can move on to a decision block 384.

In the decision block 384, it can be determined whether or not the lid 28*c* is in with a predetermined number of counts X of a stopped position. For example, as noted above, the encoder wheel 218 (FIG. 12) causes the sensor 220 to issue pulses as the encoder wheel 218 rotates. The number of pulses required to move the lid 28*c* between open and closed positions can be determined beforehand. Thus, the number of counts X can be any number. In some nonlimiting exemplary embodiments, the value X can be 3 or 4. However, any number of counts can be used.

If, in the decision block 384 it is determined that the lid 28*c* is not within X counts of a stop position, the routine 380 returns to operation block 382 and repeats. On the other hand, if it is determined that the lid 28*c* is within X counts of a stop position, the routine 380 can move on to a decision block 386.

In the decision block 386, it can be determined whether or not the lid 28*c* is being moved upwardly or downwardly. For example, the ECU 200 can determine whether the motor 214 is currently being operated in the opening or closing direction. If, it is determined that the motor 214 is in an opening mode, the routine 380 can move to an operation block 388.

In the operation block 388, the motor 214 can be reversed for a time period of T1. The time period T1 can be a predetermined amount of time of a magnitude designed to cause the lid 28*c* to stop smoothly when the lid is being moved in the opening direction. For example, in an exemplary but nonlimiting embodiment, the time T1 can be 0.2 seconds. Additionally, in some embodiments, when the motor is reversed, it is driven with the same drive value applied in the routine 350, but in reverse polarity. Additionally, the time T1 can be any amount of time. After the operation block 388, the routine can move on to operation block 390.

In the operation block 390, the routine 380 can stop. For example, the ECU 200 can cause the motor 214 to stop operating. However, other operations can also be carried out.

With reference again to decision block 386, if it is determined that the lid 28*c* is not moving toward an open position, the routine 380 can move to a decision block 392.

In the decision block 392, it can be determined whether or not the lid 28*c* is moving toward a closed position, or if the motor 214 is operating in a direction to close the lid. For example, the ECU 200 can determine whether or not the motor 214 is being driven in a closing direction. If it is determined that the lid 28*c* is moving in a closing direction, the routine 380 can move to an operation block 394.

In the operation block 394, the motor 214 can be reversed for a predetermined time period T2. The time period T2 can be an amount of time sufficient to cause the lid 28*c* to slow gradually and/or smoothly to a stop. The value of the time T2 can be any amount of time, and it can be the same or different from the time T1. In an exemplary but nonlimiting embodiment, the value of T2 is 0.2 seconds. However, any amount of time can also be used.

After the operation block 394, the routine 380 can move to operation block 390.

If, however, in the decision block 392, it is determined that the lid 214 is not moving downwardly, the routine 380 can return to operation block 382, operation block 390, or a fault can be triggered.

Figure 21:
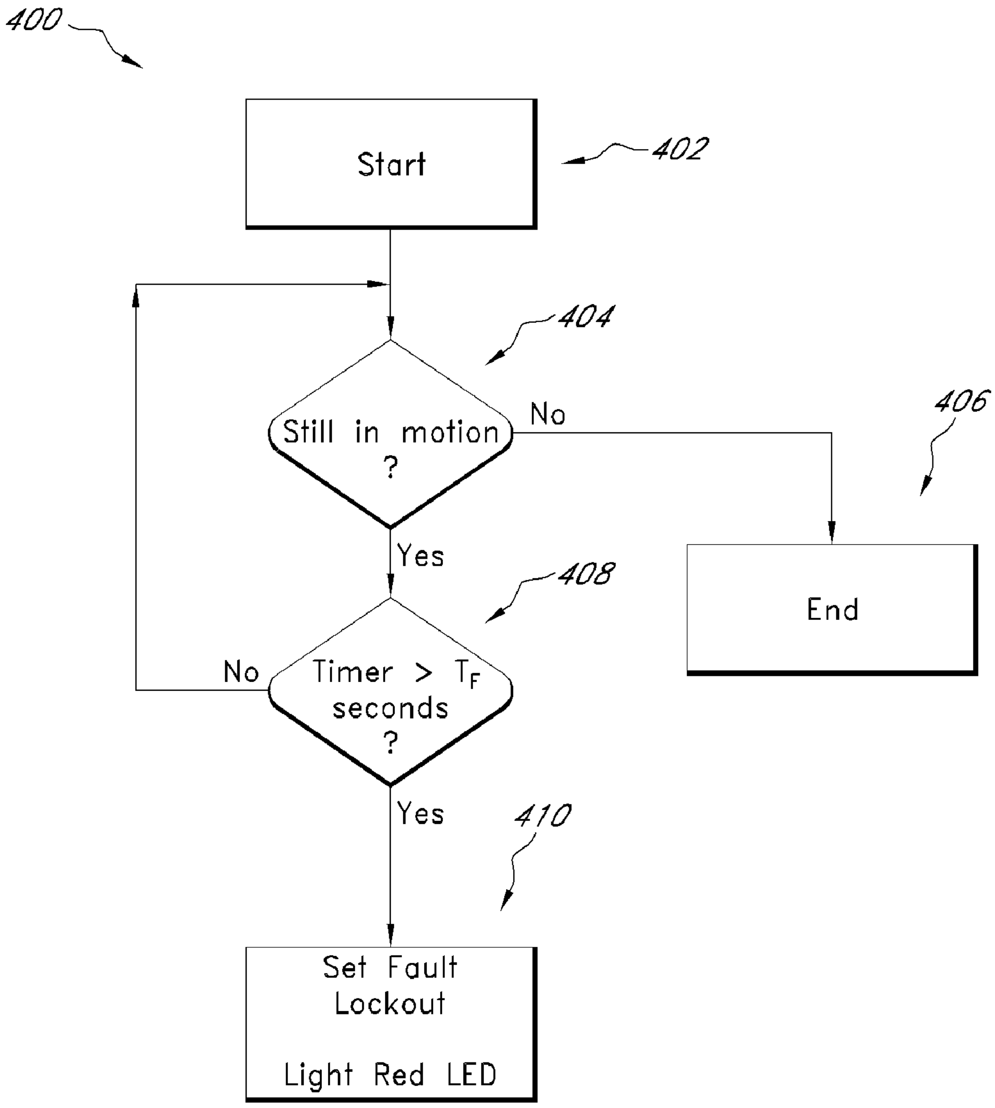
FIG. 21 is a flow chart illustrating a control routine for fault detection that can be used for controlling the electronic drive unit of FIG. 14.

With reference to FIG. 21, a control routine 400 can also be used to control the operation of the electronic drive unit 314. The control routine 400 can be designed to determine if a fault has occurred. For example, the routine 400 can be designed to determine if the motor 214 has been operated for an amount of time more than sufficient for closing or opening the lid 28*c*.

The routine 400 can begin in an operation block 402. The operation block 402 can allow the routine 400 to continue for any reason. For example, the operation block 402 can be configured to allow the routine 400 to continue if the operation block 320 (FIG. 15) of the routine 310 has been reached. After the operation block 402, the routine 400 can move on to a decision block 404.

In the decision block 404, it can be determined whether or not the lid 28*c* is currently in motion. If it is determined that the lid 28*c* is not in motion, the routine 400 can move to an operation block 406 and end.

If, however, in the decision block 404, it is determined that the lid 28*c* is in motion, the routine 400 can move on to a decision block 408.

In the decision block 408, it can be determined whether or not a timer has reached a predetermined time value Tf. For example, the ECU 200 can be configured to monitor a timer and determine if a timer has reached the value of Tf. Optionally, the operation block 402 can also include a function of resetting this timer to zero. If, in the decision block 408, it is determined that the timer has not reached the value Tf, the routine 400 can return to the decision block 404 and repeat.

However, if it is determined, in the decision block 408, that the timer has reached or exceeded the time Tf, the routine 400 can move to operation block 410.

In the operation block 410, the motor 214 can be stopped, and/or a fault can be indicated. For example, the ECU 200 can cause the motor 214 to stop, regardless of what operation is being carried out at that time. Additionally, the ECU 200 can cause the LED 116 to change color to red, or otherwise change in appearance. This change in appearance can be interpreted by a user that a fault has occurred.

Additionally, optionally, the ECU 200 can be configured to lock out any further operation of the motor 214 until the electronic drive unit of FIG. 14 has been reset. For example, the ECU 200 can lock out any further operation of the motor 214 until the main power switch 236 (FIG. 13) has been moved to an off position and then returned to an on position. However, other methods can also be used for resetting the operation of the electronic drive unit of FIG. 14.

The magnitude of the value Tf can be any value. For example, in some embodiments, the value Tf is an amount of time more than sufficient to drive the lid from between the open and closed positions. For example, in an exemplary but nonlimiting embodiment, the electronic drive unit 14 is configured to move the lid 28*c* between the open and closed positions in about 1 second regardless of the state of discharge of the power supply 132. In some non-limiting embodiments, the value Tf is set to 3 seconds. This magnitude of time, i.e., 3 seconds, is substantially more time than what is required to move the lid 28*c* between the open and closed positions, in the exemplary nonlimiting embodiment described above. Thus, if it is determined, through the routine 400, that the motor 214 has been activated for 3 seconds or more, then it is likely or possible that the lid 28*c* has hit an obstruction or some other fault has occurred. Thus, in order to prevent overheating of any parts, or unnecessary discharge of the power supply 132, the motor 214 is shut down and a fault is indicated.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An enclosed receptacle comprising:

a receptacle portion defining a reservoir;

a door mounted relative to the receptacle and configured to move between opened and closed positions;

a power supply;

a motor configured to move the door between the opened and closed positions;

a controller configured to control operation of the door, the controller comprising:

a door movement trigger module configured to allow a user to issue a command to the controller to open the door;

a power supply voltage monitor module configured to detect a voltage of the power supply only once each time the command has been detected by the door movement trigger module;

a door position monitor module having at least one sensor configured to monitor a position of the door;

a door position sensor control module configured to supply power to the at least one sensor only when the door is being moved by the motor;

a motor drive module configured to vary the power output of the motor to compensate for variations in a voltage of the power supply detected by the power supply voltage monitor and for variations in a force required to move the door at a substantially constant speed based on the position of the door detected by the door position monitor module;

a braking module configured to slow the movement of the door as it approaches a stop position by reversing the power output of the motor for a predetermined braking time beginning at a predetermined position before the opened and closed positions of the door; and a fault detection module configured to stop operation of the motor and to provide an indication of a fault if the motor has been operating for more than a predetermined time period.

2. An enclosed receptacle comprising:

a receptacle portion defining a reservoir;

a door mounted relative to the receptacle and configured to move between opened and closed positions;

a power supply;

a motor configured to move the door between the opened and closed positions;

a controller configured to control operation of the door, the controller comprising:

a door movement trigger module configured to allow a user to issue a command to the controller to open the door; and a power supply voltage monitor module configured to detect a voltage of the power supply when the command has been detected by the door movement trigger module.

3. The receptacle according to claim 2, wherein the power supply voltage monitor module is configured to detect the voltage of the power supply only once each time the command has been detected by the door movement trigger module.

4. The receptacle according to claim 3, wherein the power supply comprises a plurality of battery cells.

5. The receptacle according to claim 3, wherein the door movement trigger module comprises a light emitter device and a light receiver device, the door movement trigger module being triggered when a beam of light emitted from the light emitter device is prevented from reaching the light receiver device.

6. The receptacle according to claim 2, further comprising a fault detection module configured to stop operation of the motor and to provide an indication of a fault if the motor has been operating for more than a predetermined time period.

7. An enclosed receptacle comprising:

a receptacle portion defining a reservoir;

a door mounted relative to the receptacle and configured to move between opened and closed positions;

a power supply;

a motor configured to move the door between the opened and closed positions;

a controller configured to control operation of the door, the controller comprising:

a door movement trigger module configured to allow a user to issue a command to the controller to open the door;

a door position monitor module having at least one sensor configured to monitor a position of the door; and a door position sensor control module configured to selectively supply power to the at least one sensor when the door is being moved by the motor.

8. The receptacle according to claim 7, wherein the door position sensor control module is configured to supply power to the at least one sensor only when the door is being moved by the motor.

9. The receptacle according to claim 7, wherein the door position sensor control module is configured to cut off power to the least one sensor when the door stops moving.

10. The receptacle according to claim 7, further comprising a fault detection module configured to stop operation of the motor and to provide an indication of a fault if the motor has been operating for more than a predetermined time period.

11. An enclosed receptacle comprising:

a receptacle portion defining a reservoir;

a door mounted relative to the receptacle and configured to move between opened and closed positions;

a power supply;

a motor configured to move the door between the opened and closed positions;

a controller configured to control operation of the door, the controller comprising:

a power supply voltage monitor module configured to detect a voltage of the power supply; and a motor drive module configured to vary the power output of the motor to compensate for variations in a voltage of the power supply detected by the power supply voltage monitor.

12. The receptacle according to claim 11 additionally comprising a door position monitor module having at least one sensor configured to monitor a position of the door.

13. The receptacle according to claim 12, wherein the motor drive module is further configured to compensate for variations in a force required to move the door at a substantially constant speed based on the position of the door detected by the door position monitor module.

14. The receptacle according to claim 11, wherein the motor drive module is configured to vary the power output of the motor in accordance with a predetermined relationship between a target power output and the position of the door.

15. The receptacle according to claim 14, wherein the motor drive module is further configured to apply an offset value to the target power output based on the voltage detected by the power supply voltage monitor.

16. The receptacle according to claim 15, where in the motor drive module is configured to reduce the target power output value by a larger magnitude offset when the power supply voltage is larger and to reduce the target power output value by a smaller magnitude offset when the power supply voltage is smaller.

17. The receptacle according to claim 11, further comprising a fault detection module configured to stop operation of the motor and to provide an indication of a fault if the motor has been operating for more than a predetermined time period.

18. An enclosed receptacle comprising:

a receptacle portion defining a reservoir;

a door mounted relative to the receptacle and configured to move between opened and closed positions;

a power supply;

a motor configured to move the door between the opened and closed positions; and a controller configured to control operation of the door, the controller comprising:

a braking module configured to slow the movement of the door as it approaches a stop position by reversing the power output of the motor for a predetermined braking time beginning at a predetermined position before the opened and closed positions of the door.

19. The receptacle according to claim 18 additionally comprising a door position monitor module having at least one sensor configured to monitor a position of the door.

20. The receptacle according to claim 19, the breaking module configured to slow the movement of the door at a predetermined position detected by the door position monitor module.

21. The receptacle according to claim 18, further comprising a fault detection module configured to stop operation of the motor and to provide an indication of a fault if the motor has been operating for more than a predetermined time period.

22. An enclosed receptacle comprising:

a receptacle portion defining a reservoir;

a door mounted relative to the receptacle and configured to move between opened and closed positions;

a power supply;

a motor configured to move the door between the opened and closed positions; and a controller configured to control operation of the door, the controller comprising:

a fault detection module configured to stop operation of the motor and to provide an indication of a fault if the motor has been operating for more than a predetermined time period; and a timer, the controller resetting the timer to zero when the motor is initiated, the controller being configured to use the timer to determine if the motor has been operating for more than the predetermined time period.

23. The receptacle according to claim 22, wherein the fault detection module is configured to stop operation if the motor has been operating continuously for more than the predetermined time period.

* * * * *